(12) United States Patent
Louch et al.

(10) Patent No.: US 9,483,164 B2
(45) Date of Patent: Nov. 1, 2016

(54) USER-CENTRIC WIDGETS AND DASHBOARDS

(71) Applicant: Apple Inc., Cupertino, CA (US)

(72) Inventors: John O. Louch, San Luis Obispo, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/579,928

(22) Filed: Dec. 22, 2014

(65) Prior Publication Data

US 2015/0199114 A1 Jul. 16, 2015

Related U.S. Application Data

(63) Continuation of application No. 12/002,280, filed on Dec. 14, 2007, now Pat. No. 8,954,871.

(60) Provisional application No. 60/950,410, filed on Jul. 18, 2007.

(51) Int. Cl.
| | |
|---|---|
| *G06F 3/0482* | (2013.01) |
| *G06F 3/0484* | (2013.01) |
| *G06F 3/0481* | (2013.01) |
| *G06F 9/44* | (2006.01) |
| *G06F 9/445* | (2006.01) |
| *G06F 9/50* | (2006.01) |
| *H04L 29/08* | (2006.01) |

(52) U.S. Cl.
CPC ....... *G06F 3/04842* (2013.01); *G06F 3/04817* (2013.01); *G06F 9/4443* (2013.01); *G06F 9/44505* (2013.01); *G06F 9/5033* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 557,173 | A | 3/1896 | Thompson |
| 594,410 | A | 11/1897 | Margolis |
| 3,472,021 | A | 10/1969 | Karakawa |
| 4,752,893 | A | 6/1988 | Guttag et al. |
| 5,007,033 | A | 4/1991 | Kubota et al. |
| 5,054,008 | A | 10/1991 | Darling |
| 5,168,441 | A | 12/1992 | Onarheim et al. |
| 5,247,284 | A | 9/1993 | Fleming |
| 5,260,778 | A | 11/1993 | Kauffman et al. |
| 5,289,574 | A | 2/1994 | Sawyer |
| 5,297,250 | A | 3/1994 | Leroy et al. |
| 5,303,388 | A | 4/1994 | Kreitman et al. |
| 5,351,995 | A | 10/1994 | Booker |

(Continued)

FOREIGN PATENT DOCUMENTS

| | | |
|---|---|---|
| CN | 1191344 | 8/1998 |
| CN | 1335951 | 2/2002 |

(Continued)

OTHER PUBLICATIONS

"About Merkitys," [online] [Retrieved on Feb. 4, 2008]; Retrieved from the Internet, URL: http://meaning.3xi.org/; 3 pages.

(Continued)

*Primary Examiner* — Phenuel Salomon
(74) *Attorney, Agent, or Firm* — Fish & Richardson P.C.

(57) ABSTRACT

User-centric widgets and dashboards are automatically modified to reflect a user's goals and needs.

21 Claims, 6 Drawing Sheets

(56) References Cited

U.S. PATENT DOCUMENTS

| | | | |
|---|---|---|---|
| 5,357,603 A | 10/1994 | Parker |
| 5,388,201 A | 2/1995 | Hourvitz et al. |
| 5,416,890 A | 5/1995 | Beretta |
| 5,446,891 A | 8/1995 | Kaplan et al. |
| 5,457,476 A | 10/1995 | Jenson |
| 5,481,665 A | 1/1996 | Okada et al. |
| 5,490,246 A | 2/1996 | Brotsky et al. |
| 5,504,675 A | 4/1996 | Cragun et al. |
| 5,515,486 A | 5/1996 | Amro et al. |
| 5,522,022 A | 5/1996 | Rao et al. |
| 5,528,735 A | 6/1996 | Strasnick et al. |
| 5,537,630 A | 7/1996 | Berry et al. |
| 5,544,358 A | 8/1996 | Capps et al. |
| 5,564,002 A | 10/1996 | Brown |
| 5,570,109 A | 10/1996 | Jenson |
| 5,583,833 A | 12/1996 | Capps et al. |
| 5,588,098 A | 12/1996 | Chen et al. |
| 5,602,997 A | 2/1997 | Carpenter et al. |
| 5,603,034 A | 2/1997 | Swanson |
| 5,621,906 A | 4/1997 | O'Neill et al. |
| 5,636,336 A | 6/1997 | Adachi |
| 5,638,501 A | 6/1997 | Gough et al. |
| 5,644,737 A | 7/1997 | Tuniman et al. |
| 5,644,739 A | 7/1997 | Moursund |
| 5,651,107 A | 7/1997 | Frank et al. |
| 5,657,049 A | 8/1997 | Ludolph et al. |
| 5,659,693 A | 8/1997 | Hansen et al. |
| 5,659,694 A | 8/1997 | Bibayan |
| 5,666,416 A | 9/1997 | Micali |
| 5,666,530 A | 9/1997 | Clark et al. |
| 5,671,343 A | 9/1997 | Kondo et al. |
| 5,678,015 A | 10/1997 | Goh |
| 5,689,287 A | 11/1997 | Mackinlay et al. |
| 5,689,664 A * | 11/1997 | Narayanan | G06F 9/443 712/E9.084 |
| 5,708,764 A | 1/1998 | Borrel et al. |
| 5,710,884 A | 1/1998 | Dedrick |
| 5,710,922 A | 1/1998 | Alley et al. |
| 5,721,848 A | 2/1998 | Joseph |
| 5,724,492 A | 3/1998 | Matthews, III et al. |
| 5,727,129 A | 3/1998 | Barrett et al. |
| 5,727,135 A | 3/1998 | Webb et al. |
| 5,731,819 A | 3/1998 | Gagne et al. |
| 5,742,285 A | 4/1998 | Ueda |
| 5,742,768 A | 4/1998 | Gennaro et al. |
| 5,754,174 A | 5/1998 | Carpenter et al. |
| 5,760,773 A | 6/1998 | Berman et al. |
| 5,764,229 A | 6/1998 | Bennett |
| 5,764,238 A | 6/1998 | Lum et al. |
| 5,767,854 A | 6/1998 | Anwar |
| 5,786,815 A | 7/1998 | Ford |
| 5,790,120 A | 8/1998 | Lozares et al. |
| 5,793,368 A | 8/1998 | Beer |
| 5,793,376 A | 8/1998 | Tanaka et al. |
| 5,796,402 A | 8/1998 | Ellison-Taylor |
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,838,906 A | 11/1998 | Doyle et al. |
| 5,845,251 A | 12/1998 | Case |
| 5,845,257 A | 12/1998 | Fu et al. |
| 5,845,293 A | 12/1998 | Veghte et al. |
| 5,870,734 A | 2/1999 | Kao |
| 5,873,076 A | 2/1999 | Barr et al. |
| 5,877,741 A | 3/1999 | Chee et al. |
| 5,877,762 A | 3/1999 | Young et al. |
| 5,878,219 A | 3/1999 | Vance, Jr. et al. |
| 5,880,733 A | 3/1999 | Horvitz et al. |
| 5,880,743 A | 3/1999 | Moran et al. |
| 5,883,639 A | 3/1999 | Walton et al. |
| 5,892,519 A | 4/1999 | Hirai |
| 5,898,645 A | 4/1999 | Sugiyama |
| 5,900,876 A | 5/1999 | Yagita et al. |
| 5,903,896 A | 5/1999 | Waldman et al. |
| 5,914,716 A | 6/1999 | Rubin et al. |
| 5,917,436 A | 6/1999 | Endo et al. |
| 5,917,778 A | 6/1999 | James et al. |
| 5,920,659 A | 7/1999 | Iverson et al. |
| 5,929,852 A | 7/1999 | Fisher et al. |
| 5,930,501 A | 7/1999 | Neil |
| 5,933,148 A | 8/1999 | Oka et al. |
| 5,949,409 A | 9/1999 | Tanaka et al. |
| 5,950,002 A | 9/1999 | Hoford et al. |
| 5,963,191 A | 10/1999 | Jaaskelainen, Jr. |
| 5,974,238 A | 10/1999 | Chase, Jr. |
| 5,974,253 A | 10/1999 | Nahaboo et al. |
| 5,978,579 A | 11/1999 | Buxton et al. |
| 5,991,735 A | 11/1999 | Gerace |
| 5,999,948 A | 12/1999 | Nelson et al. |
| 6,000,000 A | 12/1999 | Hawkins et al. |
| 6,005,568 A | 12/1999 | Simonoff et al. |
| 6,006,231 A | 12/1999 | Popa |
| 6,006,274 A | 12/1999 | Hawkins et al. |
| 6,011,562 A | 1/2000 | Gagne et al. |
| 6,023,708 A | 2/2000 | Mendez et al. |
| 6,031,937 A | 2/2000 | Graffagnino |
| 6,034,621 A | 3/2000 | Kaufman |
| 6,045,446 A | 4/2000 | Ohshima |
| 6,061,695 A | 5/2000 | Slivka et al. |
| 6,062,978 A | 5/2000 | Martino et al. |
| 6,075,543 A | 6/2000 | Akeley |
| 6,104,391 A | 8/2000 | Johnston, Jr. et al. |
| 6,128,010 A | 10/2000 | Baxter et al. |
| 6,133,915 A | 10/2000 | Arcuri et al. |
| 6,141,005 A | 10/2000 | Hetherington et al. |
| 6,144,381 A | 11/2000 | Lection et al. |
| 6,154,601 A | 11/2000 | Yaegashi et al. |
| 6,157,363 A | 12/2000 | Haine |
| 6,157,371 A | 12/2000 | Smeets |
| 6,157,383 A | 12/2000 | Loop |
| 6,160,552 A | 12/2000 | Wilsher et al. |
| 6,161,176 A | 12/2000 | Hunter et al. |
| 6,166,748 A | 12/2000 | Van Hook et al. |
| 6,167,533 A | 12/2000 | Potterveld et al. |
| 6,178,443 B1 | 1/2001 | Lin |
| 6,182,212 B1 | 1/2001 | Atkins et al. |
| 6,188,399 B1 | 2/2001 | Voas et al. |
| 6,191,797 B1 | 2/2001 | Politis |
| 6,195,664 B1 | 2/2001 | Tolfa |
| 6,198,698 B1 | 3/2001 | Graves |
| 6,211,890 B1 | 4/2001 | Ohba |
| 6,216,141 B1 | 4/2001 | Straub et al. |
| 6,230,323 B1 | 5/2001 | Hama et al. |
| 6,232,957 B1 * | 5/2001 | Hinckley | G06F 3/03543 345/156 |
| 6,236,396 B1 | 5/2001 | Jenson et al. |
| 6,243,705 B1 | 6/2001 | Kucala |
| 6,246,418 B1 | 6/2001 | Oka |
| 6,253,122 B1 | 6/2001 | Razavi et al. |
| 6,259,432 B1 | 7/2001 | Yamada et al. |
| 6,266,053 B1 | 7/2001 | French et al. |
| 6,266,098 B1 | 7/2001 | Cove et al. |
| 6,266,430 B1 | 7/2001 | Rhoads |
| 6,269,405 B1 | 7/2001 | Dutcher et al. |
| 6,272,484 B1 | 8/2001 | Martin et al. |
| 6,272,558 B1 | 8/2001 | Hui et al. |
| 6,275,449 B1 | 8/2001 | Wang |
| 6,275,831 B1 | 8/2001 | Bodnar et al. |
| 6,278,448 B1 | 8/2001 | Brown et al. |
| 6,278,450 B1 | 8/2001 | Arcuri et al. |
| 6,282,711 B1 | 8/2001 | Halpern et al. |
| 6,285,374 B1 | 9/2001 | Falcon |
| 6,295,541 B1 | 9/2001 | Bodnar et al. |
| 6,333,753 B1 * | 12/2001 | Hinckley | G06F 3/03543 345/156 |
| 6,359,839 B1 | 3/2002 | Schenk et al. |
| 6,449,219 B1 | 9/2002 | Hepp et al. |
| 6,456,290 B2 | 9/2002 | Parikh et al. |
| 6,457,034 B1 | 9/2002 | Morein |
| 6,466,218 B2 | 10/2002 | Parikh et al. |
| 6,466,237 B1 | 10/2002 | Miyao et al. |
| 6,467,205 B1 | 10/2002 | Flagg et al. |

(56) References Cited

U.S. PATENT DOCUMENTS

| | | |
|---|---|---|
| 6,469,714 B2 | 10/2002 | Buxton et al. |
| 6,483,524 B1 | 11/2002 | Petchenkine et al. |
| 6,484,261 B1 | 11/2002 | Wiegel |
| 6,486,895 B1 | 11/2002 | Robertson et al. |
| 6,487,560 B1 | 11/2002 | LaRue et al. |
| 6,489,963 B2 | 12/2002 | Parikh et al. |
| 6,493,733 B1 | 12/2002 | Pollack et al. |
| 6,512,522 B1 | 1/2003 | Miller et al. |
| 6,515,682 B1 | 2/2003 | Washington et al. |
| 6,519,601 B1 | 2/2003 | Bosch |
| 6,522,347 B1 | 2/2003 | Tsuji et al. |
| 6,522,990 B1 | 2/2003 | Rains et al. |
| 6,525,736 B1 | 2/2003 | Erikawa et al. |
| 6,526,174 B1 | 2/2003 | Graffagnino |
| 6,535,892 B1 | 3/2003 | LaRue et al. |
| 6,536,041 B1 | 3/2003 | Knudson et al. |
| 6,542,160 B1 | 4/2003 | Abgrall |
| 6,542,166 B1 | 4/2003 | Washington et al. |
| 6,544,295 B1 | 4/2003 | Bodnar |
| 6,567,854 B1 | 5/2003 | Olshansky et al. |
| 6,571,245 B2 | 5/2003 | Huang et al. |
| 6,571,328 B2 | 5/2003 | Liao et al. |
| 6,573,896 B1 | 6/2003 | Ribadeau Dumas et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,593,942 B1 | 7/2003 | Bushmitch et al. |
| 6,597,358 B2 | 7/2003 | Miller |
| 6,601,988 B2 | 8/2003 | Molander |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,621,509 B1 | 9/2003 | Eiref et al. |
| 6,628,310 B1 | 9/2003 | Hiura et al. |
| 6,633,315 B1 | 10/2003 | Sobeski et al. |
| 6,636,214 B1 | 10/2003 | Leather et al. |
| 6,639,595 B1 | 10/2003 | Drebin et al. |
| 6,639,875 B2 | 10/2003 | Hall |
| 6,644,046 B2 | 11/2003 | Roh et al. |
| 6,645,070 B2 | 11/2003 | Lupo |
| 6,647,370 B1 | 11/2003 | Fu et al. |
| 6,661,426 B1 | 12/2003 | Jetha et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,675,230 B1 | 1/2004 | Lewallen |
| 6,687,745 B1 | 2/2004 | Franco et al. |
| 6,697,074 B2 | 2/2004 | Parikh et al. |
| 6,707,462 B1 | 3/2004 | Peercy et al. |
| 6,710,788 B1 | 3/2004 | Freach et al. |
| 6,710,790 B1 | 3/2004 | Fagioli |
| 6,714,201 B1 | 3/2004 | Grinstein et al. |
| 6,714,221 B1 | 3/2004 | Christie et al. |
| 6,714,486 B2 | 3/2004 | Biggs |
| 6,715,053 B1 | 3/2004 | Grigor |
| 6,717,599 B1 | 4/2004 | Olano |
| 6,724,403 B1 | 4/2004 | Santoro et al. |
| 6,734,864 B2 | 5/2004 | Abgrall |
| 6,738,804 B1 | 5/2004 | Lo |
| 6,741,242 B1 | 5/2004 | Itoh et al. |
| 6,742,042 B1 | 5/2004 | Holden et al. |
| 6,757,691 B1 | 6/2004 | Welsh et al. |
| 6,757,698 B2 | 6/2004 | McBride et al. |
| 6,760,046 B2 | 7/2004 | I'Anson et al. |
| 6,760,748 B1 | 7/2004 | Hakim |
| 6,765,592 B1 | 7/2004 | Pletcher et al. |
| 6,774,914 B1 | 8/2004 | Benayoun |
| 6,788,318 B2 | 9/2004 | Chen |
| 6,792,616 B1 | 9/2004 | Jerding et al. |
| 6,795,060 B2 | 9/2004 | Rekimoto et al. |
| 6,801,224 B1 | 10/2004 | Lewallen |
| 6,806,892 B1 | 10/2004 | Plow et al. |
| 6,819,343 B1 | 11/2004 | Sobeski et al. |
| 6,832,263 B2 | 12/2004 | Polizzi et al. |
| 6,843,723 B2 | 1/2005 | Joshi |
| 6,850,808 B2 | 2/2005 | Yuen et al. |
| 6,880,132 B2 | 4/2005 | Uemura |
| 6,882,979 B1 | 4/2005 | Reay et al. |
| 6,892,360 B1 * | 5/2005 | Pabla .................. G06F 3/0489 715/802 |
| 6,901,032 B1 | 5/2005 | Eo et al. |
| 6,906,720 B2 | 6/2005 | Emberling et al. |
| 6,910,000 B1 | 6/2005 | Yedidia et al. |
| 6,910,052 B2 | 6/2005 | Gates et al. |
| 6,911,984 B2 | 6/2005 | Sabella et al. |
| 6,912,532 B2 | 6/2005 | Andersen |
| 6,918,091 B2 | 7/2005 | Leavitt et al. |
| 6,925,477 B1 | 8/2005 | Champagne et al. |
| 6,926,199 B2 | 8/2005 | Jay et al. |
| 6,931,633 B1 | 8/2005 | Vazquez et al. |
| 6,938,218 B1 | 8/2005 | Rosen |
| 6,944,829 B2 | 9/2005 | Dando |
| 6,963,908 B1 | 11/2005 | Lynch et al. |
| 6,993,721 B2 | 1/2006 | Rosin et al. |
| 7,007,041 B2 | 2/2006 | Multer et al. |
| 7,007,242 B2 | 2/2006 | Suomela et al. |
| 7,016,011 B2 | 3/2006 | De Haan |
| 7,024,381 B1 | 4/2006 | Hastings et al. |
| 7,027,055 B2 | 4/2006 | Anderson et al. |
| 7,028,264 B2 | 4/2006 | Santoro et al. |
| 7,030,890 B1 | 4/2006 | Jouet et al. |
| 7,036,083 B1 | 4/2006 | Zenith |
| 7,050,955 B1 | 5/2006 | Carmel et al. |
| 7,065,718 B2 | 6/2006 | Lection |
| 7,076,730 B1 | 7/2006 | Baker |
| 7,082,577 B1 | 7/2006 | Brosnahan |
| 7,085,994 B2 | 8/2006 | Gvily |
| 7,107,546 B2 | 9/2006 | Coulthard |
| 7,127,473 B2 | 10/2006 | Agassi et al. |
| 7,127,509 B2 | 10/2006 | Wu |
| 7,127,713 B2 | 10/2006 | Davis et al. |
| 7,134,095 B1 | 11/2006 | Smith et al. |
| 7,146,563 B2 | 12/2006 | Hesmer et al. |
| 7,162,628 B2 | 1/2007 | Gentil et al. |
| 7,170,510 B2 | 1/2007 | Kawahara et al. |
| 7,174,512 B2 | 2/2007 | Martin et al. |
| 7,177,915 B2 | 2/2007 | Kopchik |
| 7,185,290 B2 | 2/2007 | Cadiz et al. |
| 7,191,399 B2 | 3/2007 | Ohtani et al. |
| 7,194,743 B2 | 3/2007 | Hayton et al. |
| 7,216,305 B1 | 5/2007 | Jaeger |
| 7,216,351 B1 | 5/2007 | Maes |
| 7,218,575 B2 | 5/2007 | Rosevear |
| 7,222,155 B1 | 5/2007 | Gebhardt et al. |
| 7,224,963 B2 | 5/2007 | Anderson et al. |
| 7,242,406 B2 | 7/2007 | Robotham et al. |
| 7,245,310 B2 | 7/2007 | Kawahara et al. |
| 7,249,327 B2 | 7/2007 | Nelson et al. |
| 7,260,380 B2 | 8/2007 | Dietl et al. |
| 7,269,792 B2 | 9/2007 | Consolatti et al. |
| 7,274,375 B1 | 9/2007 | David |
| 7,278,112 B2 | 10/2007 | Numano |
| 7,281,202 B2 | 10/2007 | Croney et al. |
| 7,293,034 B2 | 11/2007 | Paya et al. |
| 7,293,070 B2 | 11/2007 | Moses et al. |
| 7,305,491 B2 | 12/2007 | Miller et al. |
| 7,315,848 B2 | 1/2008 | Pearse et al. |
| 7,328,435 B2 | 2/2008 | Trifon |
| 7,346,373 B2 | 3/2008 | Kim |
| 7,346,766 B2 | 3/2008 | Mackin et al. |
| 7,353,234 B2 | 4/2008 | Kimball et al. |
| 7,353,465 B2 | 4/2008 | Callaway et al. |
| 7,356,816 B2 | 4/2008 | Goodman et al. |
| 7,392,483 B2 | 6/2008 | Wong et al. |
| 7,401,104 B2 | 7/2008 | Shah et al. |
| 7,426,687 B1 | 9/2008 | Schultz et al. |
| 7,434,177 B1 | 10/2008 | Ording et al. |
| 7,437,485 B1 | 10/2008 | Kruglikov et al. |
| 7,441,108 B2 | 10/2008 | Fisher et al. |
| 7,472,350 B2 | 12/2008 | Hintermeister et al. |
| 7,478,326 B2 | 1/2009 | Holecek et al. |
| 7,480,873 B2 | 1/2009 | Kawahara |
| 7,487,467 B1 | 2/2009 | Kawahara et al. |

(56) References Cited

U.S. PATENT DOCUMENTS

| | | | |
|---|---|---|---|
| 7,490,295 B2 | 2/2009 | Chaudhri et al. |
| 7,502,838 B2 | 3/2009 | Franco et al. |
| 7,503,010 B2 | 3/2009 | Chaudhri et al. |
| 7,516,158 B2 | 4/2009 | Drukman et al. |
| 7,523,401 B1 | 4/2009 | Aldridge |
| 7,530,026 B2 | 5/2009 | Chaudhri et al. |
| 7,536,647 B2 | 5/2009 | Walker et al. |
| 7,543,245 B2 | 6/2009 | Irimajiri |
| 7,546,543 B2 | 6/2009 | Louch et al. |
| 7,546,554 B2 | 6/2009 | Chiu et al. |
| 7,552,397 B2 | 6/2009 | Holecek et al. |
| 7,558,697 B2 | 7/2009 | Anderson |
| 7,568,165 B2 | 7/2009 | Amadio et al. |
| 7,590,995 B2 | 9/2009 | Nakamura et al. |
| 7,613,834 B1 | 11/2009 | Pallipuram et al. |
| 7,614,011 B2 | 11/2009 | Karidis et al. |
| 7,644,391 B2 | 1/2010 | Fisher et al. |
| 7,657,837 B2 | 2/2010 | Shappir et al. |
| 7,660,868 B1 | 2/2010 | Kembel et al. |
| 7,665,031 B2 | 2/2010 | Matthews et al. |
| 7,676,483 B2 | 3/2010 | Klug |
| 7,681,112 B1 | 3/2010 | Francis |
| 7,685,515 B2 | 3/2010 | Braud et al. |
| 7,698,658 B2 | 4/2010 | Ohwa et al. |
| 7,707,514 B2 | 4/2010 | Forstall et al. |
| 7,725,839 B2 | 5/2010 | Michaels |
| 7,730,082 B2 | 6/2010 | Sah et al. |
| 7,743,336 B2 | 6/2010 | Louch et al. |
| 7,752,556 B2 | 7/2010 | Forstall et al. |
| 7,756,723 B2 | 7/2010 | Rosow et al. |
| 7,761,800 B2 | 7/2010 | Chaudhri et al. |
| 7,765,326 B2 | 7/2010 | Robbin et al. |
| 7,765,493 B2 | 7/2010 | Chickles et al. |
| 7,774,369 B2 | 8/2010 | Herzog et al. |
| 7,784,065 B2 | 8/2010 | Polivy et al. |
| 7,793,222 B2 | 9/2010 | Chaudhri et al. |
| 7,793,227 B2 | 9/2010 | Wada et al. |
| 7,793,232 B2 | 9/2010 | Chaudhri et al. |
| 7,797,446 B2 | 9/2010 | Heller et al. |
| 7,802,246 B1 | 9/2010 | Kennedy et al. |
| 7,805,494 B1 | 9/2010 | Schwab et al. |
| 7,814,148 B2 | 10/2010 | Bell et al. |
| RE41,922 E | 11/2010 | Gough et al. |
| 7,836,403 B2 | 11/2010 | Viswanathan et al. |
| 7,873,908 B1 | 1/2011 | Varanasi et al. |
| 7,873,910 B2 | 1/2011 | Chaudhri et al. |
| 7,890,324 B2 | 2/2011 | Bangalore et al. |
| 7,895,522 B2 | 2/2011 | Wong et al. |
| 7,917,858 B2 | 3/2011 | Pereira et al. |
| 7,925,250 B2 | 4/2011 | Redpath |
| 7,925,976 B2 | 4/2011 | Shin et al. |
| 7,945,855 B2 | 5/2011 | Altman et al. |
| 7,952,748 B2 | 5/2011 | Voltz et al. |
| 7,954,064 B2 | 5/2011 | Forstall et al. |
| 7,984,384 B2 | 7/2011 | Chaudhri et al. |
| 7,996,783 B2 | 8/2011 | Ramsey et al. |
| 8,001,367 B2 | 8/2011 | Repasi et al. |
| 8,001,476 B2 | 8/2011 | Gallo |
| 8,073,866 B2 | 12/2011 | Eagle et al. |
| 8,126,774 B2 | 2/2012 | Hendrickson et al. |
| 8,245,027 B2 | 8/2012 | Bear et al. |
| 8,260,353 B2 | 9/2012 | Hugot |
| 8,281,234 B2 | 10/2012 | Sridhar |
| 8,302,020 B2 | 10/2012 | Louch et al. |
| 8,453,065 B2 | 5/2013 | Chaudhri et al. |
| 8,522,163 B2 | 8/2013 | Relyea et al. |
| 8,543,824 B2 | 9/2013 | Louch et al. |
| 8,543,931 B2 | 9/2013 | Forstall et al. |
| 8,566,732 B2 | 10/2013 | Louch et al. |
| 8,869,027 B2 | 10/2014 | Louch et al. |
| 8,954,871 B2 | 2/2015 | Louch et al. |
| 9,032,318 B2 | 5/2015 | Louch et al. |
| 9,104,294 B2 | 8/2015 | Forstall et al. |
| 2001/0000667 A1 | 5/2001 | Okawa et al. |
| 2001/0012024 A1 | 8/2001 | Rosin et al. |
| 2001/0015719 A1 | 8/2001 | Van Ee et al. |
| 2001/0017632 A1 | 8/2001 | Goren-Bar |
| 2001/0019338 A1 | 9/2001 | Roth |
| 2001/0030647 A1 | 10/2001 | Sowizral et al. |
| 2001/0035884 A1 | 11/2001 | Kikinis et al. |
| 2001/0035885 A1 | 11/2001 | Iron et al. |
| 2001/0040571 A1 | 11/2001 | Miller |
| 2001/0051876 A1* | 12/2001 | Seigel ............... G06F 17/3087 705/26.1 |
| 2002/0011446 A1 | 1/2002 | Lundquist |
| 2002/0013822 A1 | 1/2002 | West |
| 2002/0013832 A1 | 1/2002 | Hubbard |
| 2002/0026474 A1 | 2/2002 | Wang et al. |
| 2002/0049788 A1 | 4/2002 | Lipkin et al. |
| 2002/0054066 A1 | 5/2002 | Kikinis et al. |
| 2002/0054148 A1* | 5/2002 | Okada ............... G06F 3/0481 715/810 |
| 2002/0054541 A1 | 5/2002 | Hall |
| 2002/0059594 A1 | 5/2002 | Rasmussen et al. |
| 2002/0065946 A1 | 5/2002 | Narayan |
| 2002/0065949 A1 | 5/2002 | Heaton |
| 2002/0066279 A1 | 6/2002 | Kiyomatsu |
| 2002/0067376 A1 | 6/2002 | Martin et al. |
| 2002/0067378 A1 | 6/2002 | Abdelhadi et al. |
| 2002/0067418 A1 | 6/2002 | Hiroaki |
| 2002/0072408 A1 | 6/2002 | Kumagai |
| 2002/0078255 A1 | 6/2002 | Narayan |
| 2002/0078453 A1 | 6/2002 | Kuo |
| 2002/0085037 A1 | 7/2002 | Leavitt et al. |
| 2002/0087632 A1 | 7/2002 | Keskar |
| 2002/0089526 A1 | 7/2002 | Buxton et al. |
| 2002/0091697 A1 | 7/2002 | Huang et al. |
| 2002/0093516 A1 | 7/2002 | Brunner et al. |
| 2002/0095663 A1 | 7/2002 | Joory |
| 2002/0099678 A1 | 7/2002 | Albright et al. |
| 2002/0104080 A1 | 8/2002 | Woodard et al. |
| 2002/0105548 A1 | 8/2002 | Hayton et al. |
| 2002/0111934 A1 | 8/2002 | Narayan |
| 2002/0111972 A1 | 8/2002 | Lynch et al. |
| 2002/0112180 A1 | 8/2002 | Land et al. |
| 2002/0114466 A1 | 8/2002 | Tanaka et al. |
| 2002/0118217 A1 | 8/2002 | Fujiki |
| 2002/0118223 A1 | 8/2002 | Steichen et al. |
| 2002/0120673 A1 | 8/2002 | Tolson et al. |
| 2002/0129092 A1 | 9/2002 | Tolson et al. |
| 2002/0130900 A1 | 9/2002 | Davis |
| 2002/0133508 A1 | 9/2002 | LaRue et al. |
| 2002/0140740 A1 | 10/2002 | Chen |
| 2002/0140746 A1 | 10/2002 | Gargi |
| 2002/0147782 A1 | 10/2002 | Dimitrova et al. |
| 2002/0147912 A1 | 10/2002 | Shmueli et al. |
| 2002/0152098 A1 | 10/2002 | Evans et al. |
| 2002/0152279 A1 | 10/2002 | Sollenberger et al. |
| 2002/0156798 A1 | 10/2002 | LaRue et al. |
| 2002/0158902 A1 | 10/2002 | Hooker et al. |
| 2002/0171682 A1 | 11/2002 | Frank et al. |
| 2002/0174003 A1 | 11/2002 | Redmann et al. |
| 2002/0174055 A1 | 11/2002 | Dick et al. |
| 2002/0174181 A1 | 11/2002 | Wei |
| 2002/0180798 A1 | 12/2002 | Poor et al. |
| 2002/0186257 A1 | 12/2002 | Cadiz et al. |
| 2002/0194090 A1 | 12/2002 | Gagnon et al. |
| 2002/0196268 A1 | 12/2002 | Wolff et al. |
| 2003/0008661 A1 | 1/2003 | Joyce et al. |
| 2003/0008711 A1 | 1/2003 | Corbo |
| 2003/0009267 A1 | 1/2003 | Dunsky et al. |
| 2003/0011646 A1 | 1/2003 | Levine et al. |
| 2003/0018971 A1 | 1/2003 | McKenna, Jr. |
| 2003/0020671 A1 | 1/2003 | Santoro et al. |
| 2003/0032409 A1 | 2/2003 | Hutcheson et al. |
| 2003/0046316 A1 | 3/2003 | Gergic et al. |
| 2003/0061482 A1 | 3/2003 | Emmerichs |
| 2003/0065715 A1 | 4/2003 | Burdick, Jr. et al. |
| 2003/0067489 A1 | 4/2003 | Wong et al. |
| 2003/0069904 A1 | 4/2003 | Hsu et al. |
| 2003/0076369 A1 | 4/2003 | Resner et al. |
| 2003/0079038 A1 | 4/2003 | Robbin et al. |
| 2003/0080897 A1* | 5/2003 | Tranchina ............ G01S 5/0009 342/357.31 |

(56) References Cited

U.S. PATENT DOCUMENTS

| | | |
|---|---|---|
| 2003/0080995 A1 | 5/2003 | Tenenbaum et al. |
| 2003/0097659 A1 | 5/2003 | Goldman |
| 2003/0101046 A1 | 5/2003 | Krasnov |
| 2003/0112271 A1 | 6/2003 | Batalden et al. |
| 2003/0122787 A1 | 7/2003 | Zimmerman et al. |
| 2003/0123739 A1 | 7/2003 | Graffagnino |
| 2003/0125057 A1 | 7/2003 | Pesola |
| 2003/0125962 A1 | 7/2003 | Holliday et al. |
| 2003/0130984 A1 | 7/2003 | Quinlan et al. |
| 2003/0140044 A1 | 7/2003 | Mok et al. |
| 2003/0142136 A1 | 7/2003 | Carter et al. |
| 2003/0142140 A1 | 7/2003 | Brown et al. |
| 2003/0146934 A1 | 8/2003 | Bailey et al. |
| 2003/0154239 A1 | 8/2003 | Davis et al. |
| 2003/0158975 A1 | 8/2003 | Frank et al. |
| 2003/0159028 A1 | 8/2003 | Mackin et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0184552 A1 | 10/2003 | Chadha |
| 2003/0184584 A1 | 10/2003 | Vachuska et al. |
| 2003/0189597 A1 | 10/2003 | Anderson et al. |
| 2003/0191799 A1 | 10/2003 | Araujo et al. |
| 2003/0193842 A1 | 10/2003 | Harrison |
| 2003/0206195 A1 | 11/2003 | Matsa et al. |
| 2003/0208685 A1 | 11/2003 | Abdel-Rahman |
| 2004/0003402 A1 | 1/2004 | McKenna, Jr. |
| 2004/0012626 A1 | 1/2004 | Brookins |
| 2004/0015942 A1 | 1/2004 | Branson et al. |
| 2004/0024616 A1 | 2/2004 | Spector et al. |
| 2004/0032409 A1 | 2/2004 | Girard |
| 2004/0036711 A1 | 2/2004 | Anderson |
| 2004/0039934 A1 | 2/2004 | Land et al. |
| 2004/0054711 A1 | 3/2004 | Multer |
| 2004/0056900 A1 | 3/2004 | Blume |
| 2004/0070629 A1 | 4/2004 | Seifert |
| 2004/0078814 A1 | 4/2004 | Allen |
| 2004/0090969 A1 | 5/2004 | Jerrard-Dunne et al. |
| 2004/0104911 A1 | 6/2004 | Brody et al. |
| 2004/0117831 A1 | 6/2004 | Ellis et al. |
| 2004/0119754 A1 | 6/2004 | Bangalore et al. |
| 2004/0125128 A1 | 7/2004 | Chang et al. |
| 2004/0141016 A1 | 7/2004 | Fukatsu et al. |
| 2004/0142711 A1 | 7/2004 | Mahonen et al. |
| 2004/0165008 A1 | 8/2004 | Levine et al. |
| 2004/0179019 A1 | 9/2004 | Sabella et al. |
| 2004/0181580 A1 | 9/2004 | Baranshamaje |
| 2004/0183800 A1 | 9/2004 | Peterson |
| 2004/0194020 A1 | 9/2004 | Beda et al. |
| 2004/0199541 A1 | 10/2004 | Goldberg et al. |
| 2004/0199543 A1 | 10/2004 | Braud et al. |
| 2004/0199574 A1 | 10/2004 | Franco et al. |
| 2004/0203684 A1 | 10/2004 | Jokinen et al. |
| 2004/0204963 A1 | 10/2004 | Klueh et al. |
| 2004/0205504 A1 | 10/2004 | Phillips |
| 2004/0212640 A1 | 10/2004 | Mann et al. |
| 2004/0215740 A1 | 10/2004 | Frank et al. |
| 2004/0216054 A1 | 10/2004 | Mathews et al. |
| 2004/0223003 A1 | 11/2004 | Heirich et al. |
| 2004/0225955 A1 | 11/2004 | Ly |
| 2004/0230911 A1 | 11/2004 | Bent et al. |
| 2004/0237082 A1 | 11/2004 | Alcazar et al. |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010419 A1 | 1/2005 | Pourhamid |
| 2005/0010634 A1 | 1/2005 | Henderson et al. |
| 2005/0021756 A1 | 1/2005 | Grant |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0050539 A1 | 3/2005 | Burkhardt et al. |
| 2005/0057497 A1 | 3/2005 | Kawahara |
| 2005/0060193 A1 | 3/2005 | Lancaster et al. |
| 2005/0060655 A1 | 3/2005 | Gray et al. |
| 2005/0060661 A1 | 3/2005 | Kawahara et al. |
| 2005/0076305 A1 | 4/2005 | Hintermeister et al. |
| 2005/0076321 A1 | 4/2005 | Smith |
| 2005/0085272 A1 | 4/2005 | Anderson et al. |
| 2005/0088447 A1 | 4/2005 | Hanggie et al. |
| 2005/0088452 A1 | 4/2005 | Hanggie et al. |
| 2005/0091571 A1 | 4/2005 | Leichtling |
| 2005/0091690 A1 | 4/2005 | Delpuch et al. |
| 2005/0093868 A1 | 5/2005 | Hinckley |
| 2005/0105397 A1 | 5/2005 | Tuason |
| 2005/0114021 A1 | 5/2005 | Krull et al. |
| 2005/0114778 A1 | 5/2005 | Branson et al. |
| 2005/0125787 A1 | 6/2005 | Tertitski et al. |
| 2005/0144563 A1 | 6/2005 | Hough et al. |
| 2005/0144595 A1 | 6/2005 | McLean |
| 2005/0149458 A1 | 7/2005 | Eglen et al. |
| 2005/0149852 A1 | 7/2005 | Bleicher et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0172239 A1 | 8/2005 | Liu et al. |
| 2005/0183026 A1 | 8/2005 | Amano et al. |
| 2005/0193368 A1 | 9/2005 | Becker et al. |
| 2005/0198584 A1 | 9/2005 | Matthews et al. |
| 2005/0215310 A1 | 9/2005 | Boyd et al. |
| 2005/0221808 A1 | 10/2005 | Karlsson et al. |
| 2005/0229118 A1 | 10/2005 | Chiu et al. |
| 2005/0234884 A1 | 10/2005 | Drukman et al. |
| 2005/0240857 A1 | 10/2005 | Benedict et al. |
| 2005/0243373 A1 | 11/2005 | Silverbrook et al. |
| 2005/0256940 A1 | 11/2005 | Henderson et al. |
| 2005/0257167 A1 | 11/2005 | Fraleigh, Jr. et al. |
| 2005/0270274 A1 | 12/2005 | Bachmann |
| 2005/0278651 A1 | 12/2005 | Coe et al. |
| 2005/0282612 A1 | 12/2005 | Mathews |
| 2005/0283734 A1 | 12/2005 | Santoro et al. |
| 2006/0001652 A1 | 1/2006 | Chiu et al. |
| 2006/0004913 A1 | 1/2006 | Chong |
| 2006/0005207 A1* | 1/2006 | Louch ................ G06F 8/38 719/328 |
| 2006/0007875 A1 | 1/2006 | Andersen |
| 2006/0010394 A1* | 1/2006 | Chaudhri ............ B60K 35/00 715/779 |
| 2006/0015818 A1 | 1/2006 | Chaudhri et al. |
| 2006/0015846 A1 | 1/2006 | Fraleigh et al. |
| 2006/0018207 A1 | 1/2006 | Saito |
| 2006/0020898 A1 | 1/2006 | Kim et al. |
| 2006/0031264 A1 | 2/2006 | Bosworth et al. |
| 2006/0031587 A1 | 2/2006 | Paterson et al. |
| 2006/0036703 A1 | 2/2006 | Fulmer et al. |
| 2006/0036941 A1 | 2/2006 | Neil |
| 2006/0036969 A1 | 2/2006 | Guido et al. |
| 2006/0041879 A1 | 2/2006 | Bower et al. |
| 2006/0048073 A1 | 3/2006 | Jarrett et al. |
| 2006/0053384 A1 | 3/2006 | La Fetra et al. |
| 2006/0055789 A1 | 3/2006 | Jin et al. |
| 2006/0059437 A1 | 3/2006 | Conklin |
| 2006/0064422 A1 | 3/2006 | Arthurs et al. |
| 2006/0075033 A1 | 4/2006 | Bienstock et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0092768 A1 | 5/2006 | Demas |
| 2006/0095331 A1 | 5/2006 | O'Malley et al. |
| 2006/0107229 A1 | 5/2006 | Matthews et al. |
| 2006/0107231 A1 | 5/2006 | Matthews et al. |
| 2006/0111156 A1 | 5/2006 | Choi et al. |
| 2006/0112123 A1 | 5/2006 | Clark et al. |
| 2006/0123353 A1 | 6/2006 | Matthews et al. |
| 2006/0123356 A1 | 6/2006 | Sobeski et al. |
| 2006/0123359 A1 | 6/2006 | Schatzberger et al. |
| 2006/0136843 A1 | 6/2006 | Shafron |
| 2006/0150118 A1 | 7/2006 | Chaudhri et al. |
| 2006/0154649 A1 | 7/2006 | Pedersen et al. |
| 2006/0156228 A1 | 7/2006 | Gallo et al. |
| 2006/0156248 A1 | 7/2006 | Chaudhri et al. |
| 2006/0167704 A1 | 7/2006 | Nicholls et al. |

(56) References Cited

U.S. PATENT DOCUMENTS

| | | |
|---|---|---|
| 2006/0168536 A1 | 7/2006 | Portmann |
| 2006/0168538 A1 | 7/2006 | Stevens et al. |
| 2006/0171256 A1 | 8/2006 | Herbert |
| 2006/0174202 A1 | 8/2006 | Bonner |
| 2006/0184540 A1 | 8/2006 | Kung et al. |
| 2006/0197752 A1 | 9/2006 | Hurst et al. |
| 2006/0200775 A1 | 9/2006 | Behr et al. |
| 2006/0205517 A1 | 9/2006 | Malabuyo et al. |
| 2006/0206835 A1 | 9/2006 | Chaudhri et al. |
| 2006/0218499 A1 | 9/2006 | Matthews et al. |
| 2006/0230059 A1 | 10/2006 | Etgen et al. |
| 2006/0230272 A1 | 10/2006 | Lawrence et al. |
| 2006/0236257 A1 | 10/2006 | Othmer et al. |
| 2006/0248471 A1 | 11/2006 | Lindsay et al. |
| 2006/0253794 A1 | 11/2006 | Wilson |
| 2006/0271637 A1 | 11/2006 | McKeon et al. |
| 2006/0274086 A1 | 12/2006 | Forstall et al. |
| 2006/0277469 A1 | 12/2006 | Chaudhri et al. |
| 2006/0277481 A1 | 12/2006 | Forstall et al. |
| 2006/0282574 A1 | 12/2006 | Zotov et al. |
| 2007/0010942 A1 | 1/2007 | Bill et al. |
| 2007/0011026 A1 | 1/2007 | Higgins et al. |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0074126 A1 | 3/2007 | Fisher et al. |
| 2007/0078953 A1 | 4/2007 | Chai et al. |
| 2007/0097115 A1 | 5/2007 | Ok et al. |
| 2007/0101146 A1 | 5/2007 | Louch et al. |
| 2007/0101279 A1 | 5/2007 | Chaudhri et al. |
| 2007/0101288 A1 | 5/2007 | Forstall et al. |
| 2007/0101291 A1 | 5/2007 | Forstall |
| 2007/0101297 A1 | 5/2007 | Forstall et al. |
| 2007/0101433 A1 | 5/2007 | Louch et al. |
| 2007/0112739 A1 | 5/2007 | Burns et al. |
| 2007/0118813 A1 | 5/2007 | Forstall et al. |
| 2007/0129888 A1 | 6/2007 | Rosenberg |
| 2007/0130523 A1 | 6/2007 | Ku et al. |
| 2007/0130541 A1 | 6/2007 | Louch et al. |
| 2007/0157119 A1 | 7/2007 | Bishop |
| 2007/0162850 A1 | 7/2007 | Adler et al. |
| 2007/0168875 A1 | 7/2007 | Kowitz et al. |
| 2007/0198946 A1 | 8/2007 | Viji et al. |
| 2007/0203984 A2 | 8/2007 | AlHusseini et al. |
| 2007/0209013 A1 | 9/2007 | Ramsey et al. |
| 2007/0233736 A1 | 10/2007 | Xiong et al. |
| 2007/0243852 A1 | 10/2007 | Gibbs |
| 2007/0261001 A1 | 11/2007 | Nagiyama et al. |
| 2007/0266093 A1 | 11/2007 | Forstall et al. |
| 2007/0273558 A1 | 11/2007 | Smith et al. |
| 2007/0275736 A1 | 11/2007 | Baek et al. |
| 2007/0293186 A1* | 12/2007 | Lehmann .......... G08B 13/19621 455/404.2 |
| 2007/0300185 A1 | 12/2007 | Macbeth et al. |
| 2007/0300225 A1 | 12/2007 | Macbeth et al. |
| 2008/0001924 A1 | 1/2008 | de los Reyes et al. |
| 2008/0008049 A1 | 1/2008 | Landsberg |
| 2008/0016468 A1 | 1/2008 | Chambers et al. |
| 2008/0034309 A1 | 2/2008 | Louch et al. |
| 2008/0034314 A1 | 2/2008 | Louch et al. |
| 2008/0036591 A1* | 2/2008 | Ray .................. H04M 1/72569 340/540 |
| 2008/0040681 A1 | 2/2008 | Synstelien et al. |
| 2008/0052348 A1 | 2/2008 | Adler et al. |
| 2008/0082382 A1 | 4/2008 | Castineiras |
| 2008/0097906 A1 | 4/2008 | Williams et al. |
| 2008/0120658 A1 | 5/2008 | Cubillo |
| 2008/0126937 A1 | 5/2008 | Pachet |
| 2008/0155453 A1 | 6/2008 | Othmer |
| 2008/0168367 A1 | 7/2008 | Chaudri et al. |
| 2008/0168368 A1 | 7/2008 | Louch et al. |
| 2008/0168382 A1 | 7/2008 | Louch et al. |
| 2008/0215998 A1 | 9/2008 | Moore et al. |
| 2008/0235602 A1 | 9/2008 | Strauss et al. |
| 2008/0243548 A1 | 10/2008 | Cafer |
| 2008/0256479 A1 | 10/2008 | Hemmings |
| 2008/0266289 A1 | 10/2008 | Park |
| 2008/0288578 A1 | 11/2008 | Silfverberg |
| 2008/0313567 A1 | 12/2008 | Sabin et al. |
| 2009/0005071 A1 | 1/2009 | Forstall et al. |
| 2009/0024943 A1 | 1/2009 | Adler et al. |
| 2009/0024944 A1 | 1/2009 | Louch et al. |
| 2009/0077493 A1 | 3/2009 | Hempel et al. |
| 2009/0100368 A1 | 4/2009 | Look et al. |
| 2009/0119127 A2 | 5/2009 | Rosow et al. |
| 2009/0125815 A1 | 5/2009 | Chaudhri et al. |
| 2009/0144644 A1 | 6/2009 | Chaudhri et al. |
| 2009/0158193 A1 | 6/2009 | Chaudhri et al. |
| 2009/0187841 A1 | 7/2009 | Chaudhri et al. |
| 2009/0228824 A1 | 9/2009 | Forstall et al. |
| 2009/0260022 A1 | 10/2009 | Louch et al. |
| 2009/0264198 A1 | 10/2009 | Takahashi et al. |
| 2009/0271724 A1 | 10/2009 | Chaudhri et al. |
| 2010/0077338 A1 | 3/2010 | Matthews et al. |
| 2010/0115471 A1 | 5/2010 | Louch et al. |
| 2010/0138295 A1 | 6/2010 | Caron et al. |
| 2010/0211886 A1 | 8/2010 | Forstall et al. |
| 2010/0229095 A1 | 9/2010 | Forstall et al. |
| 2010/0242110 A1 | 9/2010 | Louch et al. |
| 2011/0099487 A1* | 4/2011 | Pyhalammi .............. G06F 8/38 715/762 |
| 2011/0231790 A1 | 9/2011 | Forstall et al. |
| 2013/0125007 A1 | 5/2013 | Chaudhri et al. |
| 2014/0026090 A1 | 1/2014 | Chaudhri et al. |

FOREIGN PATENT DOCUMENTS

| | | |
|---|---|---|
| CN | 1425151 | 6/2003 |
| DE | 102 42 378 | 3/2004 |
| EP | 0 548 586 | 6/1993 |
| EP | 0 908 835 | 4/1999 |
| EP | 1 237 076 | 9/2002 |
| EP | 1 383 080 | 1/2004 |
| EP | 0 972 273 | 3/2004 |
| EP | 0 694 879 | 11/2005 |
| EP | 1 724 996 | 11/2006 |
| JP | 4214595 | 8/1992 |
| JP | 05-210477 | 8/1993 |
| JP | 8-211167 | 8/1996 |
| WO | WO 96/06401 | 2/1996 |
| WO | WO 97/07467 | 2/1997 |
| WO | WO 98/07112 | 2/1998 |
| WO | WO 98/45815 | 10/1998 |
| WO | WO 01/46790 | 6/2001 |
| WO | WO 02/09039 | 1/2002 |
| WO | WO 02/25382 | 3/2002 |
| WO | WO 03/023593 | 3/2003 |
| WO | WO 03/102817 | 12/2003 |
| WO | WO 2004/023294 | 3/2004 |
| WO | WO 2004/027707 | 4/2004 |
| WO | WO 2004/076977 | 9/2004 |
| WO | WO 2006/012343 | 2/2006 |
| WO | WO 2006/020304 | 2/2006 |
| WO | WO 2006/119269 | 11/2006 |
| WO | WO 2009/012319 | 1/2009 |
| WO | WO 2009/012330 | 1/2009 |

OTHER PUBLICATIONS

"Advanced Digital Photo Solutions," GeoSpatial Experts; [online] [Retrieved on Feb. 4, 2008]; Retrieved from the Internet, URL: http://www.geospatialexperts.com/productadv.html; 4 pages.

"Comparison of widget engines," [online] Retrieved from the Internet, URL: http://en.wikipedia.org/wiki/Comparison_of_widget_engines, 2007; 4 pages.

"Coolsmartphone"; Apr. 17, 2006, [online] [Retrieved on Sep. 11, 2009]; Retrieved from the Internet, URL: http://www.web.archive.org/web/20060417080115/http://www.coolsmartphone.com/article569.html; 24 pages.

"Dashboard Blog," Dec. 11, 2003, [online] [Retrieved from the Internet on May 11, 2007], URL: http://www.nat.org/dashboard/blog.php3, 31 pages.

(56) References Cited

OTHER PUBLICATIONS

"Desktop Sidebar," [online] [Retrieved on May 11, 2007] Retrieved from the Internet URL: http://web.archive.org/web/20040101160831/http://www.desktopsidebar.com/; 5 pages.
"Garmin hits iphone directly with nuvifone"; [online] [Retrieved on Mar. 17, 2008]; Retrieved from the Internet, URL: http://www.electronista.com/print/50764; 3 pages.
"Garmin® nüvifone™ Images," [online] [Retrieved from the Internet on Feb. 4, 2008], URL: http://www8.garmin.com/buzz/nuvifone/media_gallery.jsp; 2 pages.
"Garmin® nüvifone™ Takes Personal Navigation and Communication to the Next Level"; Garmin International; [online] [Retrieved on Mar. 17, 2008]; Retrieved from the Internet, URL: http://www8.garmin.com/pressroom/mobile/013008.html; 3 pages.
"Go View Map Save to Favorites Cancel"; [online] [Retrieved on Feb. 4, 2008]; Retrieved from the Internet, URL: http://www8.garmin.com/buzz/nuvifone/m/g/sc-geotag-lg.jpg; 1 page.
"GPS Blogging Phones"; [online] [Retrieved on Apr. 5, 2006], Retrieved from the Internet at URL: http://www.dailywireless.org/modules.php?name=News&file=article&sid=4613; 3 pages.
"How it Works"; Navizon—Peer-to-Peer Wireless Positioning; [online] [Retrieved on Nov. 30, 2007]; Retrieved from the Internet, URL: http://www.navizon.com/FullFeatures.htm, 7 pages.
"International Roaming Guide—Personal Experience(s) from Customer and Community Member"; [online] [Retrieved on Jun. 26, 2006], Retrieved from the Internet, URL: http://forums.cingular.com/cng/board/message?board.id=international&message.id=1185; 6 pages.
"Inter-widget communication?", [online] [Retrieved on Jun. 5, 2009], Retrieved from the Internet URL: http://www2.konfabulator.com/forums/lofiversion/index.php/t125.html; 3 pages.
"MOREnet Dialing Plan: PSTN and IP Network Integration for H.323, H320 VoIP and Public Voice Networks", [online] [Retrieved on Jan. 11, 2008] Retrieved from the Internet, URL: http://www.more.net/technical/research/dialplan/index.html; 12 pages.
"New Improved Panoramio—Geo Photo Sharing"; Google Earth Blog; [online] [Retrieved on Feb. 5, 2008]; Retrieved from the Internet, URL: http://www.gearthblog.com/blog/archives/2006/06/new_improved_pa.html, 1 page.
"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.
"Portlet-to-portlet communication between JSR 168 portlets on public pages", Apr. 5, 2006, [online]; Retrieved from the Internet URL: http://www.ibm.developerworks/websphere/library/techarticles/0604_scott/0604_scott.html; 9 pages.
"Sidekick", [Online] [Retrieved on Oct. 12, 2009] Retrieved from the Internet at URL: http://en.widipedia.org/wiki/Sidekick; 5 pages.
"Snap, Map and Share Your World"; IsWhere by Red Hen Systems; [online] [Retrieved on Jun. 3, 2008]; Retrieved from the Internet, URL: http://www.redhensystems.com/products/multimedia_mapping_software/iswhere/default.asp?sm=2; 1 page.
"Snippets Software Platform," Snippet Software Inc., Jun. 2001, [online] [Retrieved on Jun. 11, 2001] Retrieved from the Internet <URL:http://www.snippets.com/products/>.
"Starfish Software Introduces Starfish Internet Sidekick; Starfish Internet Sidekick is the best way for Internet users to manage their calendar, contacts and communications," Business Wire, Sep. 23, 1996, [online] [Retrieved on Dec. 8, 2008]; Retrieved from the Internet URL: http://findarticles.com/articles/mi_mOEIN/is_1996_Sept$_{13}$ 23/ai_18704672?tag=rel.res1; 2 pages.
"Welcome to the Gigaplex!™", Lazar Productions, Nov. 1996, [online] [Retrieved on Dec. 8, 2008] Retrieved from the Internet URL: http://web.archive.org/web/19961105081827/www.gigaplex.com/; 4 pages.
"Welcome to the Land of Mirrors," Open Enterprise Magazine, Mar. 1, 2004, pp. 82-85, vol. 2, No. 3, (With Partial English Translation).
"Windows Sidebar", Wikipedia [online] [Retrieved on May 11, 2007] Retrieved from the Internet, URL:http://en.wikipedia.org/wiki/Windows-Sidebar, 2007, 2 pages.
"Convert just about Anything to Anything else", Online Conversion.com, [online] [Retrieved on Jun. 22, 2008]; Retrieved from the Internet, URL: http://web.archive.org/web/20000815055422/http://www.onlineconversion.com/; 2 pages.
"Objects, Images and Applets," [online] [Archived by http://archivve.org; Retrieved on Apr. 13, 2006], Retrieved from the Internet URL: http://web.archivve.org/web/20030210154019/http://www.w3.org/TR/REC-html140/struct/objects.html; 21 pages.
"Writing a Desk Accessory," Developer Connection, Apple Computer, Inc., Jul. 3, 1996, [online] [Retrieved on May 11, 2009] Retrieved from the Internet URL: http://developer.apple.com/documentation/mac/devices/devices-16.html, 4 pages.
A Better Konspose Background, Aug. 10, 2004, 1 page.
Adam Baratz, Konfabulator 2.0 Before there was Dashboard, there was Konfabulator. While Apple was wokring on . . . Jun. 22, 2005, 9 pages.
Akeley et al., "Real-Time Graphics Architecture," http://www.graphics.stanford.edu/courses/cs448a-01-fall, the OpenGL® Graphics System, CS448 Lecture 15, Fall 2001, pp. 1-20.
Akeley, "Cg—Teaching Cg," Power Point Presentation, NVIDIA Corporation, Apr. 17, 2003, 1 page.
Altman, "Visual QuickStart Guide PowerPoint 2000/98, Applying Preset Animations", ProQuest Safari Books, Peachpit Press, May 7, 1999, [online] Retrieved from the Internet: URL: http://proquest.safaribooksonline.com/0201354411; 7 pages.
Authorized officer Karine Lambert, International Search Report/Written Opinion in PCT/US2008/70198 mailed Jun. 10, 2009, 10 pages.
BabelFish.com, Inc., Oct. 2003, [online] [Retrieved on Dec. 8, 2008]; Retrieved from the Internet URL: http://web.archive.org/web/20031002115902/www.babelfish.com/en/index.html; 1 page.
Balazs Fejes, "Programming Konfabulator Widgets," Feb. 25, 2006, 5 pages.
Baratz et al., "DesktopX 3/1", Ars Technica, Nov. 17, 2005, [online] [Retrieved on Aug. 1, 2008]; Retrieved from the Internet URL: http://arstechnica.com/reviews/apps/desktopx/ars; 4 pages.
Bauer and Deru, "Motion-Based Adaptation of Information Services for Mobile Users," *Lecture Notes in Computer Science*, Aug. 19, 2005, Retrieved from the Internet, URL: http://www.springerlink.com/content/1wdvxw9ervxa44f9/fulltext.pdf>,[retrieved on Sep. 15, 2009], 6 pages.
Bauer, "Transparent User Modeling for a Mobile Personal Assistant," *LWA 2004: Lernen-Wissensentdecking-Adaptivitat*, [Online] Oct. 6, 2004, pp. 3-8, Berlin Retrieved from the Internet: URL:http://www.dfki.de/specter/Docs/Bauer04.pdf> [retrieved on Sep. 15, 2009].
Beier et al., "The Bull's-Eye: A Framework for Web Application User Interface Design Guidelines", Proceedings of the Sigchi Conference on Human Factors in Computing Systems, Apr. 2003, pp. 489-496.
Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.
Cadiz et al., "Slideshow: Providing Peripheral Awareness of Important Information," Technical Report MSR-TR-2001-83, Microsoft Corporation, Redmond, WA; Sep. 14, 2001; 9 pages.
Carey et al., "Integrating Widget Design Knowledge with User Interface Toolkits", Proceedings of the Fifth International Workshop on Computer-Aided Software Engineering, Jul. 1992, pp. 204-212.
Chen et al., "The Model of Optimum Route Selection in Vehicle Automatic Navigation System Based on Unblocked Reliability Analyses", Intelligent Transportation Systems, 2003, Proceedings, IEEE (2003), vol. 2, 12-15, Oct. 2003, pp. 975-978.
Chinese Notification of First Office Action, Chinese Patent Application No. 200580016349.3, Jul. 25, 2008, 21 pages.
Conner et al. "Three-Dimensional Widgets" ACM 1992, pp. 183-188 and 230-231.
Dashboard vs Konfabulator, Apr. 25, 2005, 31 pages.
Dashboard Widgets, Jun. 8, 2005, 2 pages.
DesktopX 3: Creating a widget, Mar. 6, 2005, 7 pages.

(56) References Cited

OTHER PUBLICATIONS

Discovering the Dashboard, Apr. 28, 2005, 10 pages.
eHow' VMWare, http://www.ehow.com/how_6368_minimize-window.html, "How to Minimize a Window," Jun. 2004.
Elliott, "Programming Graphics Processors Functionally," Proceedings of the 2004 Haskell Workshop, Sep. 22, 2004, 11 pages.
Examiner Goran Milasinovic, Extended European Search Report in EP 12 16 6655 mailed Nov. 26, 2012, 7 pages.
Fried, Ina, "Developer Calls Apple's Tiger a copycat," CNET News.com, Jun. 28, 2004 [online] Retrieved on May 6, 2009], Retrieved from the Internet URL: http://news.cnet.com2100-1045_3-5250692.html; 2 pages.
Fried, Ina, "For Apple's Tiger, the kyword is search", CNET News.com, Jun. 28, 2004, [online] [Retrieved on May 5, 2009], Retrieved from the Internet URL: http://archive.org/web20040823135016/http://zdnet.com-com/2102-11032-5250346.html; 2 pages.
Gabbard et al., "User-Centered Design and Evaluation of Virtual Environments," Nov./Dec. 1999, IEEE Computer Graphics and Applications, pp. 51-59.
Gruber et al., "Dashboard vs. Konfabulator", Jun. 2004; 10 pages.
Grundy, "An environment for developing adaptive, multi-device user interfaces," *AUIC '03 Proceedings of the Fourth Australasian User Interface Conference on User Interfaces*, 2003, vol. 18, Australian Computer Society, Inc., Darlinghurst, Australia.
Haeberli et al., "The Accumulation Buffer: Hardware Support for High-Quality Rendering," Computer Graphics, Aug. 1990, 24(4):309-318.
Han, "Bi-manual, multi-point, and multi-user interactions on a graphical interaction surface", Multi-Touch Interaction Research; [online] [Retrieved on Apr. 13, 2006]; Retrieved from the Internet, URL: http://mrl.nyu.edu/~jhan/ftirtouch/; 4 pages.
Harold R. "Java Network Programming, Second Edition, 2nd edition" O'Reilly & Associates 2000 pp. 1-731 (Cover page and Table of Contents enclosed).
Helal et al., "Drishti: An Integrated Navigation System for Visually Impaired and Disabled", Fifth International Symposium on Wearable Computers (ISWC'01), IEEE, 2001, pp. 149-156.
Hide all Widgets on Desktop, Oct. 12, 2004, 5 pages.
Horvitz et al., "The Lumiere Project: Bayesian User Modeling for Inferring the Goals and Needs of Software Users," *Fourteenth Conference on Uncertainty in Artificial Intelligence*, Madison, WI, Jul. 1998, Morgan Kaufman Publishers, pp. 256-265.
How-To Keeping Multiple Dashboard Widgets on the Desktop, Apr. 30, 2005, 8 pages.
International Search Report and the Written Opinion, dated Jan. 27, 2006, issued in International Application No. PCT/US2005/022579; 15 pages.
International Search Report and the Written Opinion, dated May 8, 2008, issued in International Application PCT/US2007/077441, 17 pages.
International Search Report and Written Opinion, dated Oct. 16, 2009, issued in International Application No. PCT/US2008/070217.
International Search Report and Written Opinion, dated Sep. 3, 2009, issued in International Application No. PCT/US2008/050047, 17 pages.
International Search Report, dated Aug. 8, 2005, issued in International Application PCT/US2005/008805, 3 pages.
International Search Report, dated Jul. 10, 2006, issued in International Application PCT/US2005/022152, 1 page.
International Search Report, dated Jul. 27, 2005, issued in International Application PCT/US2005/008804, 3 pages.
Inter-Widget Messaging!, I want my widgets to work together !, Feb. 7, 2005, 4 pages.
Invitation to Pay Additional Fees and Communication Relating to the Results of the Partial International Search, dated Jan. 28, 2008, issued in International Application PCT/US2007/077441, 8 pages.
Invitation to Pay Additional Fees and Communication Relating to the Results of the Partial International Search, dated Jul. 29, 2008, issued in International Application PCT/US2008/050295, 10 pages.
Invitation to Pay Additional Fees and Communication Relating to the Results of the Partial International Search, dated May 15, 2009, issued in International Application No. PCT/US2008/050047, 11 pages.
Invitation to Pay Additional Fees and Communication Relating to the Results of the Partial International Search, dated May 8, 2009, issued in International Application PCT/US2008/050038, 19 pages.
JavaBoutique, [online], Retrieved from the Internet URL: http://javaboutique.internet.com/utilities/counter.html; Oct. 1, 2002, 2 pages.
Javaboutique. Oct. 8, 2008. Available at: http://web.archive.org/web/20021208051951/http://javaboutique.internet.com/utilities/counter.html (may be duplicate of earlier javaboutique reference).
Joyce, "The fabulous Konfabulator: what can it really do?" Dec. 1, 2005, 3 pages.
Kniss et al., "Interactive Volume Rendering Using Multi-Dimensional Transfer Functions and Direct Manipulation Widgets," Oct. 24-26, 2001, 1 page.
Konfabulator 1.7—Now with Konspose and Unicode Support!, Jun. 25, 2004, 11 pages.
Konfabulator Release Notes, Jul. 9, 2004, 3 pages.
Konfabulator, "Cupertino, Start your Photocopiers!," [online] [Retrieved on Jul. 1, 2004]; Retrieved from the Internet URL: http://www.konfabulator.com, 1 page.
Konfabulator, "Konfabulator & Widget Basics—A Refresher Course in Widgetology", [online] [Retrieved on Jun. 5, 2009], Retrieved from the Internet URL: http://web.archive.org/web/20050811020610/http://konfabulator.com/basics; 16 pages.
Konfabulator, "Konfabulator & Widget Basics", [online] [Retrieved on Jul. 1, 2004]; Retrieved from the Internet URL: http://www.konfabulator.com/info/basics.html, 3 pages.
Konfabulator, "Screenshots," [online] [Retrieved on Jul. 1, 2004]; Retrieved from the Internet URL: http://www.konfabulator.com/info/screenshots.html, 2 pages.
Konfabulator, "What is Konfabulator?," [online] [Retrieved on Jul. 1, 2004]; Retrieved from the Internet URL: http://www.konfabulator.com/info/; 3 pages.
Konspose and Activation, Jun. 30, 2004, 2 pages.
Konspose Only—what's the deal?, Oct. 18, 2005, 2 pages.
Konspose Speed, Sep. 24, 2004, 3 pages.
Lammers et al., "Maya 4.5 Fundamentals: Particles", New Riders Publishing, Jan. 14, 2003, [online] [Retrieved on Feb. 17, 2007] Retrieved from the Internet URL: http://proquest.safaribooksonline.com/0735713278; 12 pages.
Lieberman and Selker, "Agents for the User Interface," *Handbook of Agent Technology*, 2003, pp. 1-20, Retrieved from the Internet, URL: http://web.media.mit.edu/{lieber/Publications/Agents_for_UI.pdf> [retrieved on Sep. 15, 2009].
Macworld Unveils Dashboard Widget, Aug. 30, 2005, 5 pages.
Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.
Microsoft Corporation, "User's Guide Microsoft® Windows™ and MS-DOS® 6", 1993, pp. Cover-xvi, 112-121.
Microsoft, "Microsoft Windows XP—Microsoft Word 2003," 2003, 11 pages.
Mizuno, T., "Visiting a Development Environment," Interface Magazine, Jun. 1, 2003, pp. 146-152, vol. 29, No. 6, (With Partial English Translation).
Movies.com, Jan. 2002, [online] [Retrieved on Dec. 8, 2008]; Retrieved from the Internet URL: http://www.archive.org/web/20020118102516/movies.go.com; 1 page.
Pruder, "Extending Desktop Applications to the Web," Proc Jun. 2004 International Symposium on Information and Communication Technologies, 2004, vol. 90, 6 pages.
Rist et al., "Customizing Graphics for Tiny Displays of Mobile Devices", *Personal and Ubiquitous Computing*, 2002, 6:260-268.
Rochkind et al., "Common Elements in Today's Graphical User Interfaces: The Good, the Bad, and the Ugly," *Interchi '93*, AMC, Apr. 24-29, 1993, pp. 470-473.
Rodriguez et al., "IBM WebSphere Portal V5 A Guide for Portlet Application Development," Feb. 1, 2004, 48 pages.

(56) References Cited

OTHER PUBLICATIONS

Scott Collins, "Konfabulator: The Beginning Widget Writer's Guide," Jan. 15, 2006, 28 pages.
Segal et al., "The OpenGL® Graphics System: A Specification (Version 1.5)," © 1992-2003 Silicon Graphics, Inc., Oct. 30, 2003, 333 pages.
Shantzis, "A Model for Efficient and Flexible Image Computing," Computer Graphics Proceedings, Annual Conference Series, Orlando, Florida, Jul. 24-29, 1994, pp. 147-154.
Shiozawa et al., "Perspective Layered Visualization of Collaborative Workspaces," Proceedings of the International ACM SIGGROUP conference on Supporting Group Work Publisher, Nov. 1999, 10 pages.
Silicon Graphics, Inc., "IRIX Interactive Desktop User Interface Guidelines," 2001, Chapter 3, 26 pages.
Siracusa, "Mac OS X 10.4 Tiger: Dashboard", Apr. 28, 2005, [online] [Retrieved on Aug. 1, 2008] Retrieved from the Internet URL: http://arstechnica.com/reviews/os/macosx-10-4.ars/17; 7 pages.
Snippet Software, "Product Spotlight Non-browser based portal solution from Snippets Software," *Corporate Portal Newsletter*, Oct. 2000, 1(10) 3 pages.
Snippet Software, "Snippets Information Delivery Platform," [online] [Retrieved on Jun. 11, 2001]; Retrieved from the Internet URL: http://www.snippets.com/products/; 19 pages.
Snippets Software, "Products Overview," Feb. 2002, [online] [Retrieved on Feb. 5, 2008] Retrieved from the Internet URL: http://web.archive.org/web/20020206061508/http://www.snippets.com/products/; 2 pages.
Staples, "Representation in Virtual Space: Visual Convention in the Graphical User Interface," Proceedings of the SIGCHI Conference on Human Factors in Computing Systems, Apr. 1993 [online] [Retrieved on Dec. 2003] Retrieved from the Internet URL: http://www.nat.org/dashboard/blog.php3 Dec. 2003; 8 pages.
Stardock, "Gallactica Civilization: Dread Lords—User Manual," Stardock Entertainment © 2006; 65 pages.
Stardock, "Your Edge in Software," [online] [Retrieved on May 11, 2007]; Retrieved from the Internet URL: http://www.stardock.com/media.asp?cmd=mediakits; 56 pages.
Stardock, "DesktopX General Guide," Aug. 2000, [online] [Retrieved on Jan. 31, 2008]; Retrieved from the Internet URL:http://www.stardock.com/products/desktopx/docs/; 28 pages.
Stardock, "DesktopX Tutorial," Aug. 2000, [online] [Retrieved on Jan. 31, 2008]; Retrieved from the Internet URL:http://www.stardock.com/products/desktopx/tutorial.html; 40 pages.
Stardock, "DesktopX WhitePaper," Aug. 2000, [online] [Retrieved on Jan. 31, 2008] Retrieved from the Internet URL: http://www.stardock.net/media/whitepaper_desktopx.html; 15 pages.
Stardock, "The User Guide—Version 2," DesktopX 2000; 57 pages.
Stardock, "What Can It Do? Making Objects", DesktopX Tutorial, 2001, [online] [Retrieved on Apr. 11, 2008]; Retrieved from the Internet URL: http://web.archive.org/web/20011019222825/http://www.stardock.com/products/desktopx/ . . . ; 6 pages.

Tang et al., "ConNex to Awarenex: Extending Awareness to Mobile Users," SIGCHI '01, AMC, Mar. 31-Apr. 4, 2001, 8 pages.
TellWidget, Sep. 5, 2005, 3 pages.
Thomas et al., "Animating Widgets in the InterViews Toolkit", Lecture Notes in Computer Science, pp. 26-44, 1995.
Ullenboom, "Java is auch eine Insel," 2003, [online] [Retrieved on Apr. 13, 2006]; Retrieved from the Internet URL: http://www.galileocomputing.de/openbook/javainsel2//java_140000.htm#Xxx998138, 3 pages.
Van Gelder et al., "Direct Volume Rendering with Shading via Three-Dimensional Textures," Computer Science Dept., Univ. of California, Santa Cruz, CA 95064, Jul. 19, 1996, 17 pages.
VMware™, "VMware™ Workstation User's Manual, Version 3.2", 2002; cover, pp. 12-13.
Wardell, "Apple's Dashboard vs. Konfabulator vs. DesktopX," Skinning the frog, Jul. 1, 2004, [online] [Retrieved on Aug. 1, 2008]; Retrieved from the Internet URL: http://frogboy.joeuser.com/article/19800; 9 pages.
Wardell, "Konfabulator for Windows", Jan. 10, 2004, [online] [Retrieved on Mar. 6, 2006]; Retrieved from the Internet URL: http://www.xpthemes.com/forums.aps?MID=19&CMID=19&AID=4472, 6 pages.
Warren, "The VMware Workstation 5 Handbook", Jun. 2005, Course Technology PTR, 50 pages.
Web.archive.org et al., "Digital Dashboard," Microsoft.com, published Oct. 24, 2001, 42 pages.
Widget Creation Tutorial, Oct. 30, 2005, 25 pages.
Widget Test Ground, Dec. 1, 2005, 5 pages.
Widget to widget communication, Jun. 29, 2006, 2 pages.
Widgets 1.0, Nov. 9, 2006, 13 pages.
Widgets only when needed, Jul. 8, 2004, 3 pages.
Willett, E., et al., "Microsoft Office 2003 Bible," Chapter 1, Oct. 2, 2003, pp. 1-14, Can be retrieved at <http://media.johnwiley.com.au/product_data/excerpt/93/07 64 5394/07 64 539493 .pdf>.
Wincustomize.com et al. "Currency Widget" 2004 1 page, [online] [Retrieved on Feb. 15, 2010] Retrieved from the internet <URL:http://www.wincustomize.com/skins.aspx?skinid~200&libid~34>.
Wincustomize.com et al. "M14 Weather ColorPak" Oct. 5, 2004, 1 page, [online] [Retrieved on Feb. 15, 2010] Retrieved from the internet <URL:http://www.wincustomize.com/ skins.aspx?skinid~1 59&libid~34>.
Wincustomize.com et al. "Movie Listings" Sep. 2004, 7 pages, [online] [Retrieved on Feb. 15, 2010] Retrieved from the internet <URL:http://www.wincustomize.com/skins.aspx?skinid~101&libid~34&p~l>.
Wincustomize.cometal. "CNB-WeatherWidget", Mar. 26, 2004, 1 page, [online] [Retrieved on Feb. 15, 2010] Retrieved from the internet <URL:http://www.wincustomize.com/ skins.aspx?skinid~25&libid~34>.
Yahoo Widget Engine Reference Manual, Dec. 7, 2005, 229 pages.
Yes . . . another Newbie in need of Help! How do I set Hotkeys?, Jul. 25, 2004, 2 pages.
Abel, Todd et. al. Microsoft Office 2000: Create Dynamic Digital Dashboards Using Office, OLAP and DHTML; Jul. 2000, pp. 1-18.

* cited by examiner

USER-CENTRIC WIDGETS AND DASHBOARDS

RELATED APPLICATIONS

This application is a continuation of and claims priority to U.S. patent application Ser. No. 12/002,280, entitled "User-Centric Widgets and Dashboards," filed on Dec. 14, 2007, which claims the benefit of priority from U.S. Provisional Patent Application No. 60/950,410, filed Jul. 18, 2007, for "User-Centric Widgets and Dashboards," the entire contents of each of which are incorporated herein by reference.

This application is related to U.S. patent application Ser. No. 11/403,644, for "Linked Widgets," filed Apr. 12, 2006, which patent application is incorporated by reference herein in its entirety.

TECHNICAL FIELD

The subject matter of this patent application is generally related to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that include information and one or more tools that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Widgets can be displayed and accessed through an environment referred to as a "unified interest layer," "dashboard layer," "dashboard environment," or "dashboard."

The popularity of widgets has led to a proliferation of publicly available widgets that can perform a variety of useful tasks. The abundance of widgets, however, has created a need for technology that applies user-centric criteria to the distribution, installation, preview, configuration and presentation of widgets and/or dashboards.

SUMMARY

User-centric widgets and dashboards are automatically modified to reflect a user's goals and needs.

In some implementations, a method includes: providing a user interface; presenting a widget on the user interface; receiving input; updating a user model based on the input; and updating the widget based on the user model.

In some implementations, a method includes: collecting user data; updating a user model with the user data; and updating a dashboard or widget based on the user model.

In some implementations, a system includes a processor and a computer-readable medium operatively coupled to the processor. A data collection engine stored on the computer-readable medium is configurable by the processor for collecting user data from the system. A user model engine stored on the computer-readable medium and operatively coupled to the data collection engine is configurable by the processor for receiving user data from the data collection engine and updating a user model using the user data. An update engine stored on the computer-readable medium and operatively coupled to the user model engine is configurable for updating a widget based on the user model.

Other implementations of user-centric widgets and dashboards are disclosed, including implementations directed to systems, methods, apparatuses, computer-readable mediums and user interfaces.

DETAILED DESCRIPTION

Dashboard & Widget Overview

Figure 1:
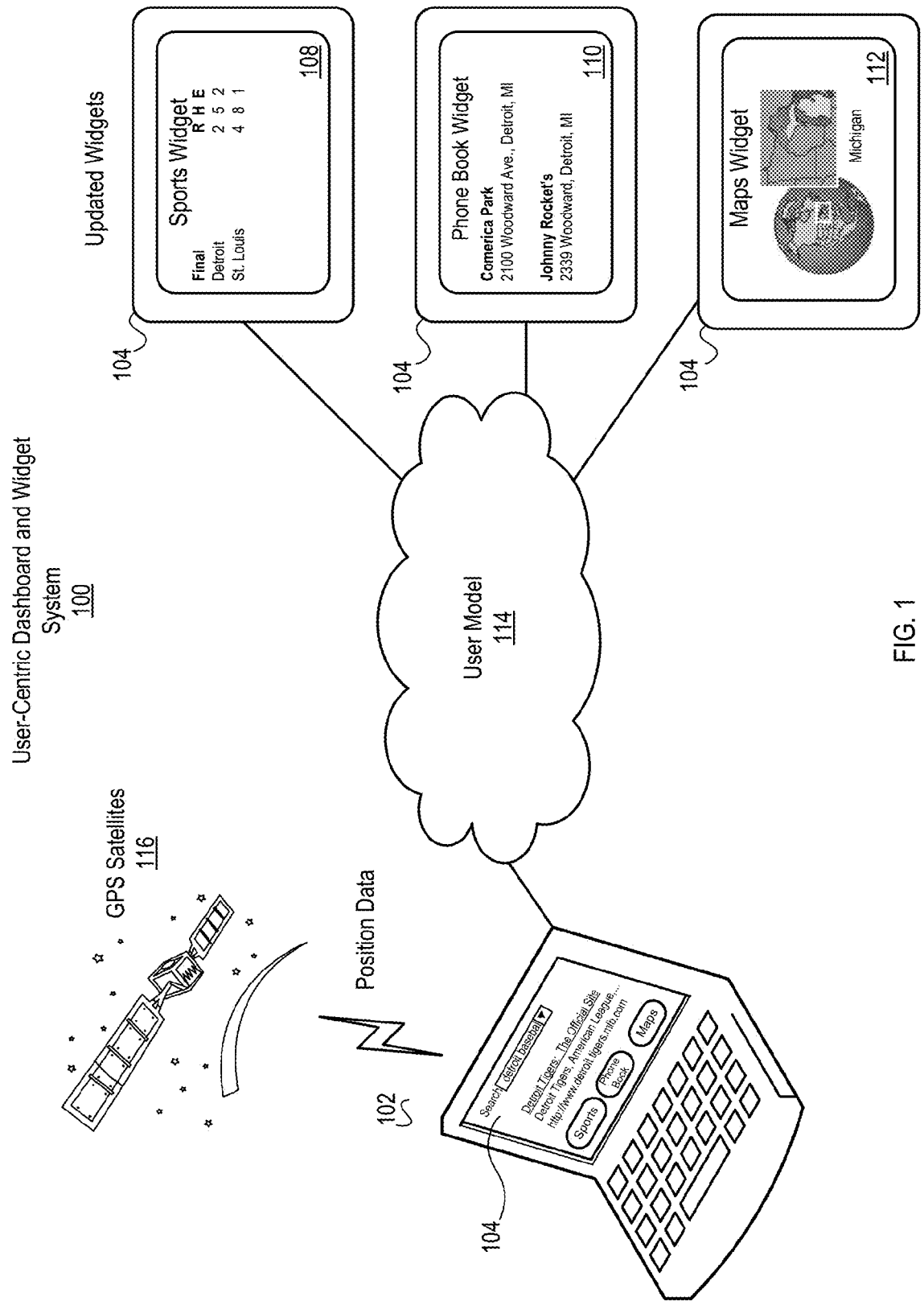
FIG. 1 is a block diagram of one implementation of a user-centric dashboard and widget system.

A dashboard is an environment or layer where information and utilities can be displayed. The information and utilities can be embodied in "widgets." Multiple widgets can exist in a dashboard at any given time. Users can control what widgets are visible and can freely move the widgets in the dashboard. In some implementations, widgets can be displayed and hidden along with the dashboard and can share the dashboard. When the dashboard is dismissed, the widgets disappear along with the dashboard.

In some implementations, widgets are objects that users interact with when a dashboard is invoked. In other implementations, widgets can be displayed in any user interface without a dashboard, including an operating system window (e.g., a desktop) or application window, or one or more display areas (or portions thereof) of a user interface.

Widgets can perform tasks for the user, such as providing a clock or a calculator. A widget can present useful information to the user or help the user obtain information with a minimum of required input. In some implementations, widgets are powered by known web technologies, such as Hypertext Mark-up Language (HTML), Cascading Style Sheets (CSS) and JavaScript®. Some widgets can also provide preferences, localization and system access. In the description and examples that follow, a user interacts with representations of dashboards and widgets, such as icons or thumbnail images. These representations may be referred to simply as dashboards or widgets throughout the specification and claims.

In some implementations, a dashboard is displayed such that a user can select a widget, causing the widget to be displayed without a dashboard (e.g., on a desktop user interface or application window). In such implementations, the user can click on a button or other user interface element to get back the dashboard.

Widgets can be developed using publicly available software development tools, such as Web Kit, Dashcode® and Xcode®, which are available from Apple Computer, Inc. (Cupertino, Calif.). Web Kit provides a set of classes to display web content in windows, and implements browser features such as following links when clicked by the user, managing a back-forward list, and managing a history of pages recently visited. The Web Kit simplifies the process of web page loading by asynchronously requesting web content from an HTTP server where the response may arrive incrementally, in random order, or partially due to network errors. The Web Kit also simplifies the process of displaying that content and compound frame elements each with their own set of scroll bars. Dashcode® provides developers with tools for building widgets. Xcode® is a tool for developing software on Mac OS® X, and is bundled with Apple's Mac OS® X, version 10.4 ("Tiger") operating system.

In some implementations, a widget can be distributed as a bundle structure. A bundle is a directory in a file system that groups related resources together in one location. A widget's bundle can contain an information property list file, an HTML file, icon and default image files (e.g., portable network graphics files) and a style information file (e.g., a CSS file). In some implementations, the information property list file provides a dashboard with information about a widget (e.g., name, version, widget height and width, x and y coordinates for placement of the widget close box, etc.). The dashboard can use the information property list file to set up a space or "view" in the dashboard in which the widget can operate. The information property list file can also include access keys which provide access to external resources (e.g., the Internet).

User-Centric Dashboard/Widget System

FIG. 1 is a block diagram of one implementation of a user-centric dashboard and widget system 100. The system 100 generally includes a device 102 configured for coupling to a network. In some implementations, the device 102 is a "location-aware" device and includes means for determining its geographic location using positioning technology. Positioning technology can include a Global Positioning System (GPS) 116, analog acoustic time-of-flight (TOF), cellular grid technology, geo-location by Internet Protocol (IP) address or any other positioning technology. The positioning information can be computed by the device 102 or provided to the device 102 over, for example, the network. In some implementations, the device 102 can include components (e.g., a GPS receiver) for receiving positioning information from the GPS 116 and computing a geographic location.

The network (e.g., the Internet, wireless network) can be coupled to a repository (e.g., a My SQL® database) for storing a user model 114, configuration data, updates and any other user-centric information associated with the device 102. The device 102 can be coupled to the network using any known connector, port or bus (e.g., USB, Firewire®, Ethernet, DSL, cable modem, wireless link).

The system 100 is one example of a user-centric dashboard and widget system. Other configurations are possible including more or fewer components. For example, the device 102 can be any device capable of presenting dashboards and/or widgets, including but not limited to: consumer electronic devices, computers, mobile phones, media players/recorders, game consoles, tablets, set-top boxes, television systems, personal digital assistants (PDAs), storage devices, digital cameras, digital video recorders, email devices, etc. In some implementations, the device 102 can operate without being connected to the network or the GPS system 116.

User Model Approach

In some implementations, the system 100 automatically modifies dashboards and/or widgets installed on the device 102 based on the types of tasks or sequence of actions performed on the device 102 by a user. For example, in some implementations when a user performs a sequence of actions on the device 102 (e.g., interacts with an application hosted on the device 102), the actions can be observed and recorded as user data. A user model 114 can then be updated or otherwise modified with the user data.

In some implementations, the user model 114 can be implemented using Bayesian and decision-theoretic methods, such as the methods described in, for example, Horvitz, E., et al. The Lumiere Project: Bayesian User Modeling for Inferring the Goals and Needs of Software Users, *Fourteenth Conference on Uncertainty in Artificial Intelligence* (Madison, Wis., July 1998), Morgan Kaufman Publishers, pp. 256-265, which article is incorporated by reference herein in its entirety. A Bayesian user model can be created by observing several classes of evidential distinctions with relevance to a user's needs. Some or all of these classes can be sub-classed with specific types of data structures and displayed objects to provide a rich set of observations with probabilistic links to a user's goals.

Examples of classes of evidence can include but are not limited to:

Search: Repetitive, scanning patterns associated with attempts to search for or access an item or functionality can be used to determine a user's goals and needs. Distinctions can include observation of the user exploring multiple menus, scrolling through text and mousing over and clicking on multiple non-active regions.

Focus of attention: Selection and/or dwelling on graphical objects, dwelling on portions of a document or on specific subtext after scrolling through the document.

Introspection: A sudden pause after a period of activity or a significant slowing of the rate of interaction.

Undesired effects: Attempts to return to a prior state after an action. These observations including undoing the effect of a recent action, including issuing an undo command, closing a dialog box shortly after it is opened without invoking an operation offered in the context of the dialog.

Inefficient command sequences: User performing operations that could be done more simply or efficiently via an alternate sequence of actions or through easily accessible shortcuts.

Domain-specific syntactic and semantic content. Consideration of special distinctions in content or structure of documents and how the user interacts with these features. These can include domain-specific features associated with the task.

Other techniques for user modeling include but are not limited to: machine-learning, neural networks, predictive statistical models, user model servers, etc. For example, the system 100 can include a user model server, which can be a process that communicates with clients (e.g., dashboards and widgets) and supplies the clients with information about the goals and needs of the user.

In some implementations, the user data can be collected automatically (e.g., on a scheduled basis) or in response to a trigger event. In some implementations, the user data collection process can be manually turned off and on by the user through a preference pane or user interface element (e.g., a button). The user data collection process can be run on the device 102 as a foreground or background process. In some implementations, the user data collection process can be performed by an application running on the network.

In some implementations, user data can be used to search for and/or identify dashboards and/or widgets that can assist the user in achieving a goal or fulfilling a need. For example, the user can be presented with a list of dashboards and/or widgets that the user can download, invoke or preview that can assist the user in achieving a goal or otherwise fulfill a need of the user.

In some implementations, the user data can be used to configure and present dashboards and/or widgets on a display or other output device. Configuring dashboards and widgets can include providing easier access to certain features or functionality, modifying default presentations, forming relationships or links between dashboards and/or widgets and providing update or modifications that conform the dashboard and/or widget to the goals or needs of the user.

Heuristic Model Approach

In some implementations, the system 100 automatically modifies dashboards and/or widgets based on a heuristic model created from input provided by experts. A heuristic model can include a set of rules, which if complied with, indicate that the user is performing a certain task. Patterns of user activity can be compared with a heuristic model to determine how dashboards and widgets should be configured and presented on the device 102 to help the user perform the task. The dashboards and widgets can then be modified to conform to the task and facilitate performance of the task by the user Examples of User-Centric Widget Applications In the example shown, a user of device 102 (e.g., a notebook computer with a wireless connection and GPS) is performing an Internet search on the search query: "detroit baseball." These search terms could be indicative of the user's interest in Detroit City and baseball. The search results include a link to the official Web site of the Detroit Tigers baseball team. Additionally, the device 102 is receiving position information from the GPS 116, and therefore the device 102 is "location-aware." The search terms and positioning information are used to update the user model 114 for the user. In this example, the user model 114 can be stored and maintained on the device 102 and/or on the network.

Referring to the left-hand side of FIG. 1, several user-centric widgets are presented in full screen on a display 104 of the device 102. The widgets presented on the display 104 include a sports widget 108 for providing scores and other information for sporting events, a phone book widget 110 for providing phone numbers and addresses and a maps widget 112 for providing maps. Other user-centric widgets are possible, including but not limited to: a travel guide widget, a maps widget, a music widget, a movie widget, a weather widget, a world clock widget, a stocks widget, a photo widget, a search engine widget and a currency converter widget.

In the example shown, the user was performing a search on the terms "detroit" and "baseball." These terms (i.e., user data) was incorporated into the user model 114. When the user launches the widgets 108, 110, 112, by clicking on representations (or icons) of the widgets on the display 104, the widgets are opened and presented on the display 104 in full screen. The presentations are in formats that conform with the user model 114 that has been modified with the user data. As a result of the modified user model 114, the sports widget 108 displays the final score of the most recent Detroit Tigers game, the phone book widget 110 displays the address of Comerica Park (the Tiger's home field) and other locations of interest near Comerica park (e.g., restaurants) and the maps widget 112 displays a map of Detroit, Mich. and/or Comerica Park. These presentations are merely examples and other formats are possible depending on the user model 114.

In some implementations, the position information from GPS 116 or other positioning technology can be used to modify the states or presentations of the widgets 108, 110 and 112, to conform to the user's goals. In some implementations, the dashboard and/or widgets can be modified after a task is repeated several times (e.g., a history of user actions) to ensure that assumptions regarding the user's goals and needs are accurate. In some implementations, either the position information or the query terms (not both) can be used to trigger a modification of the widgets 108, 110 and 112.

The widgets 108, 110 and 112 are examples of user-centric widgets that can be modified by the user model 114, heuristic model and/or geographic location data. Other examples of user-centric widgets include but are not limited to: a weather widget, a World clock widget and a currency widget. For example, if a user expresses an interest in Tokyo, then the weather widget can present the weather in Tokyo in a prominent manner, the World clock widget can present the local time in Tokyo in a prominent manner and the currency converter can present the Yen as a default currency. A user can express a goal or need in a variety of ways that can be tracked by the system 100. For example, the user can express an interest in Tokyo by searching the Internet for subject matter related to Tokyo. Or, if the user is using the device 102 in Tokyo, then the geographic location of the device 102 can be used to infer a goal or need of the user. In some implementations, if the user receives a large number of emails from Tokyo or routinely surfs web sites related to Tokyo, such actions could be an expression of the user's goals or needs.

In some implementations, the use of a particular dashboard and/or widget will trigger the invocation of another dashboard and/or widget. For example, the frequent use of the phone book 110 widget can trigger the invocation of the maps widget 112, even if the maps widget 112 was not previously used or invoked by the user on the device 102. Dashboards or widgets that are not used a lot can be removed from the device 102. Widgets that can trigger the invocation of other widgets are described in U.S. patent application Ser. No. 11/403,644, for "Linked Widgets," filed Apr. 12, 2006, which patent application is incorporated by reference herein in its entirety.

In some implementations, a user interaction with an application can be used to modify the configuration, state and/or presentation of a dashboard and/or widget. Each application can provide metadata which can be used to configured or present a dashboard and/or widget. For example, a music player application may provide metadata indicating a user's preference for certain genres of music. This metadata can be used to modify the presentation of a music widget (e.g., iTunes® widget) by, for example, prominently displaying music files or other related information in the preferred genre. After the application is terminated, the configuration and/or presentation of the dashboard and/or widget can be made persistent or can revert to a default state.

In some implementations, user interaction with external devices (e.g., digital cameras, storage devices) can be used to infer a user's goals and needs. For example, a digital camera may provide metadata (e.g., date/time, camera orientation, lighting, resolution, position coordinates) that can be used to modify a dashboard and/or widget, or identify new dashboards and/or widgets for download, installation, preview and presentation, etc. The metadata can then be used with a "photo widget" that provides a default presentation having functionality determined by the metadata.

In some implementations, the user model 114 can be used to identify a user based the user's pattern of activity. For example, in a multi-user environment where multiple users share the same device, the user model can be used to identify the user that is currently using the device based on the user's patterns of activity.

Device Architecture for User-Centric Dashboards & Widgets

Figure 2:
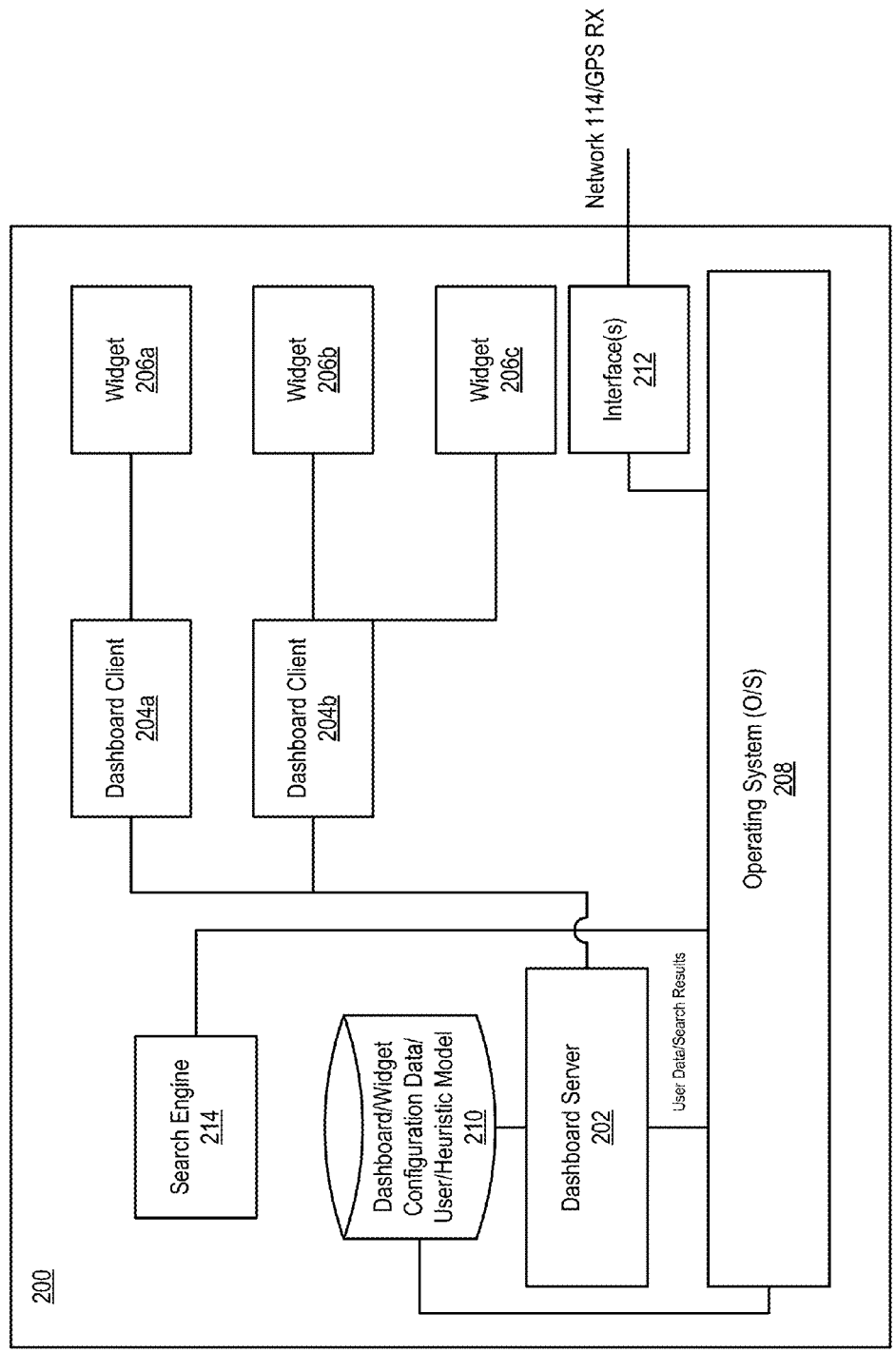
FIG. 2 is a block diagram of an exemplary run time architecture for a device running user-centric dashboards and widgets.

FIG. 2 is a block diagram of an exemplary runtime architecture 200 for a device running user-centric dashboards and widgets. In some implementations, the architecture generally includes a dashboard server 202, dashboard clients 204, widgets 206, an operating system 208 (e.g., Mac OS® X, Windows® XP, Linux® OS), dashboard configuration information repository 210 and one or more interfaces 212 (e.g., network interface card, DSL or cable, modem, PCI card slots).

In some implementations, user-centric information is received through the network interface 212 and stored in the repository 210. In the example shown, the network interface 212 is coupled to the network and a GPS receiver (RX), respectively, for receiving user-centric information from a dashboard/widget configuration service 500 (FIG. 5) and position information from GPS 116. The dashboard server 202 uses the user-centric information and position information to configure one or more dashboards and/or widgets for presentation on the device 102, as described in reference to FIG. 1. In some implementations, the dashboard server 202 can also receive user data and search results from the operating system 208. The search results can be generated by a search engine 214, which can be located in the dashboard server 202, integrated with the operating system 208, or provided in a separate application or plug-in.

In some implementations, the dashboard server 202 is a process that manages one or more dashboard user interfaces. The dashboard server 202 also handles the launching of widgets 206. In some implementations, the dashboard clients 204 are processes that provide the glue between the dashboard server 202 and individual widgets 206. In some implementations, each widget is run inside a separate dashboard client 204. In other implementations, multiple widgets (e.g., 206b, 206c) can run inside each dashboard client 204 (e.g., dashboard client 204b). For example, the clients 204 can provide views in the dashboard for displaying a user interface. In the example shown, the dashboard server 202 launches one client 204 per running widget 206 which provides a sandbox so that the widget 206 does not affect other widgets or applications.

The dashboard server 202 manages one or more widgets 206. If a widget 206 crashes, the widget 206 can be automatically restarted so that the widget reappears in the dashboard. If a widget 206 misbehaves (e.g., crashing more than x times in a row), the widget 206 can be automatically removed from the dashboard.

Widgets 206 can be displayed in the dashboard created by the dashboard server 202 or in other user interfaces, such as a desktop or in a browser or application window (e.g., Safari®). In some implementations, a widget 206 can be stored as a "bundle" of files in the repository 210 (e.g., hard disk, RAM, ROM, flash memory). A bundle is a directory that groups all the needed resources for the widgets 206 together in one place. Widget bundles can be named with a unique extension (e.g., .wdgt).

In some implementations, a given widget contains at least the following files: 1) an HTML file defining a user interface for the widget; 2) a default background image that can be displayed by the dashboard while it loads the widget; 3) an icon image used to represent the widget; and 4) a property list file that contains the widget's identifier, name, version information, size, and main HTML page and other optional information used by the dashboard. The bundle can include other files as needed for the widget, include but not limited to CSS files and JavaScript® files.

In some implementations, a scripting language (e.g., JavaScript®) can be used to provide dynamic behavior in widgets. A script can be distinguished from a program, because programs are converted permanently into binary executable files (i.e., zeros and ones) before they are run. By contrast, scripts remain in their original form and are interpreted command-by-command each time they are run.

JavaScript® in a dashboard can work the same way as it does in any browser with the addition of a widget object. The widget object allows the following actions: 1) access to a user preferences system; 2) flipping a widget over to access preferences or other information and links; 3) respond to dashboard activation events; 4) open other applications; and 5) execute system commands, such as shell scripts or command-line tools.

For widgets built using Web Kit, any Internet plug-in can be run from within the widget. For example, a widget could display a movie using a QuickTime® Internet plug-in. In some implementations, widgets can interact with an application by loading a plug-in and using, for example, a JavaScript® object to bridge JavaScript® with an application programming language (e.g., Objective-C).

Dashboard Server Architecture Example

Figure 3A:
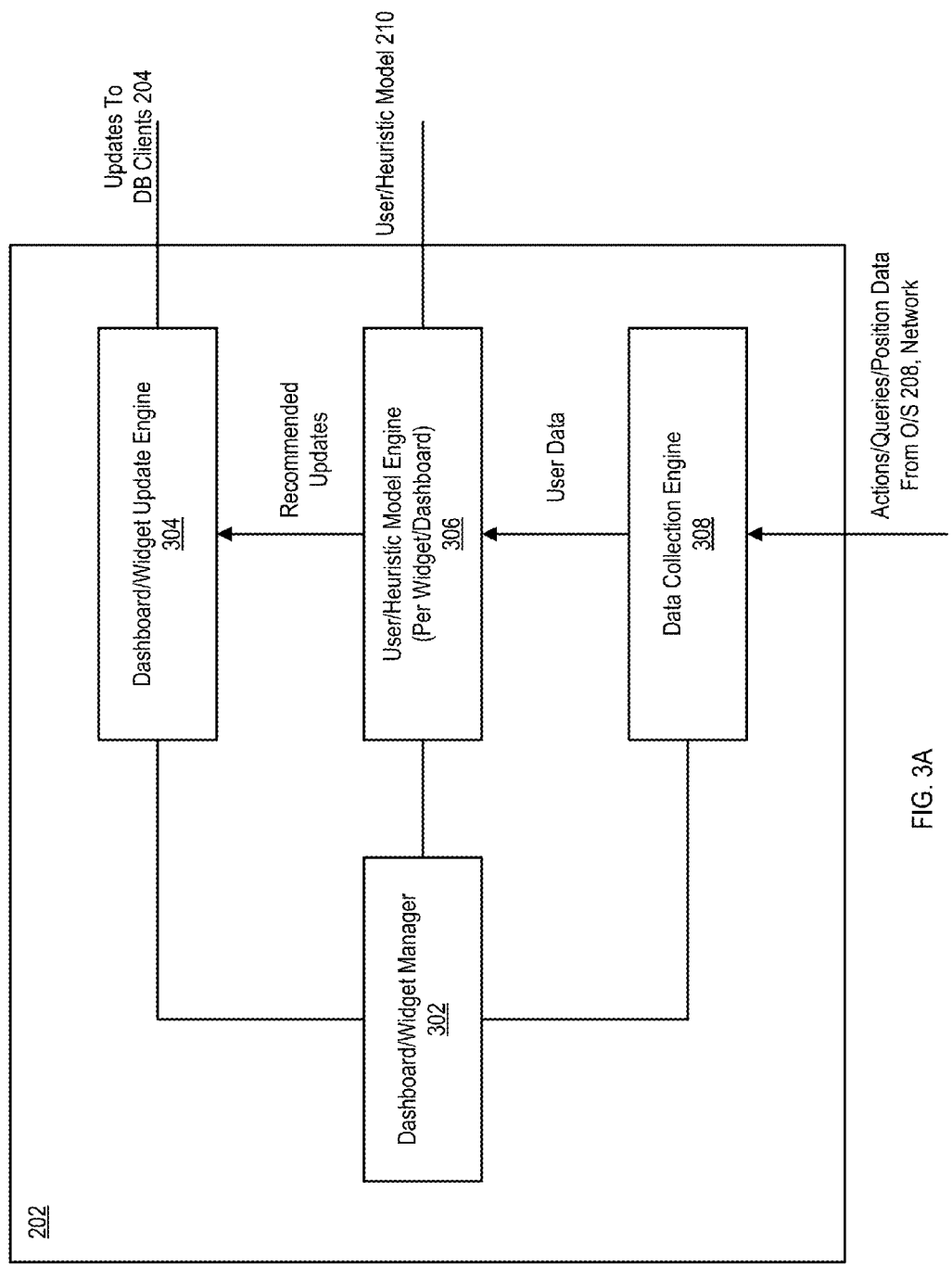
FIG. 3A is a block diagram of one implementation of a software architecture for the dashboard server shown in FIG. 2.

FIG. 3A is a block diagram of one implementation of a software architecture for the dashboard server 202 shown in FIG. 2. In some implementations, the dashboard server 202 includes components for implementing user-centric dashboards and widgets. It should be noted, however, that user-centric dashboards and widgets can be implemented using other architectures and do not have to be implemented in the dashboard server 202. For example, user-centric dashboard/widget functionality can be integrated into the operating system 208, in an application or provided as a plug-in. The components described below can be implemented in software, hardware, firmware, or any combination thereof.

Referring to FIG. 3A, in some implementations the dashboard server 202 includes a dashboard/widget manager 302, a dashboard/widget update engine 304, a user/heuristic model engine 306 and a data collection engine 308. The data collection engine 308 collects user data from one or more of an operating system 208, application, plug-in, external resource, network or any other source of user data. The user/heuristic model engine 306 is operatively coupled to the data collection engine 308 for receiving the user data. The user/heuristic model engine 306 is configurable for updating or otherwise modifying the user model 114 stored in repository 210 (FIG. 2). The dashboard/widget updater engine 304 is operatively coupled to the user/heuristic model engine 306 and is configurable for updating dashboards and widgets based on the user model 114.

In some implementations, the coordination and control of engines 304, 306 and 308 are handled by the dashboard/widget manager 302. In the configuration shown, the dashboard/widget manager 302 also handles the dashboard server and client processes described in reference to FIG. 2. The dashboard/widget manager 302 is operatively coupled to the engines 304, 306 and 308. When the user model 114 is updated, the usage/heuristic model engine 306 notifies the dashboard/widget manager 302 of the update and provides recommended modifications to the dashboard/widget update engine 304. The dashboard/widget manager 302 schedules an update with the dashboard/widget update engine 304 for updating dashboards and/or widgets based on the recommended modifications. The dashboard/widget manager 302 is operatively coupled to the data collection engine 308 for initiating or scheduling data collection processes.

The configuration shown in FIG. 3A is one example of a software architecture for implementing user-centric dashboards and widgets. Other configurations are possible, including configurations where some or all of the components in FIG. 3A are included in one or more widgets. For example, a widget can include a widget update engine, a data collection engine and a user model.

User/Heuristic Model Engine Example

Figure 3B:
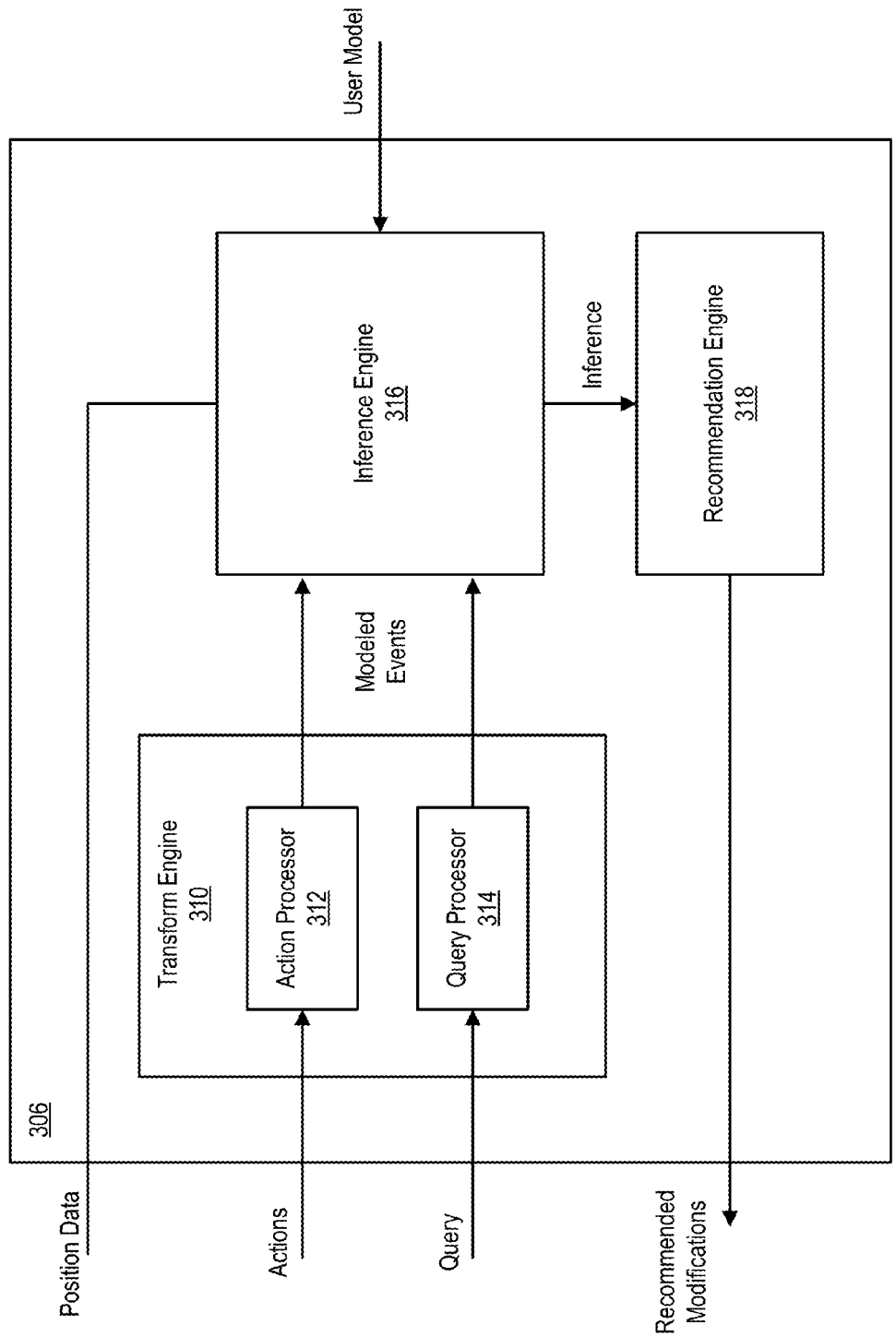
FIG. 3B is a block diagram of one implementation of the user/heuristic model engine shown in FIG. 3A.

FIG. 3B is a block diagram of one implementation of the user/heuristic model engine 306 shown in FIG. 3A. In some implementations, the user/heuristic model engine 306 includes a transform engine 310, an inference engine 316 and a recommendation engine 318.

In some implementations, the transform engine 310 includes an action processor 312 and a query processor 314. Low-level time-stamped actions provided by the operating system 208 are transformed by the action processor 312 into higher-level semantics (i.e., modeled events) representing user actions. Likewise, the query processor 314 transforms query search terms into modeled events. Examples of low-level actions can include mouse and keyboard actions, access to menus being visited, dialog boxes being opened and closed, selection of graphical objects, menu surfing, mouse meandering, menu jitter, the status of data structures, etc. After the actions and queries are transformed into modeled events, the modeled events are stored in an event queue, where the events await processing by the inference engine 316.

In some implementations, the inference engine 316 includes a Bayesian user model. Events in the queue are transformed into observations represented by in the Bayesian user model. The inference engine 318 periodically analyzes an event in the event queue and generates an inference on the event based on the user model 114 and other information (e.g., position data). The inference is received by the recommendation engine 318, which generates an update or modification recommendation for the dashboard/widget update engine 304 based on the inference. The recommendation could include identification of a particular dashboard or widget to be presented on the device 102 and a script for modifying the dashboard or widget. Examples of updates or modifications include but are not limited to: resetting default parameters, selecting new user interfaces from a plurality of template user interfaces, associating the dashboard or widget with one or more related dashboards or widgets, adding or removing features, functionality or resources to or from the dashboard or widget or any other desired modification. Modifications can be made persistent across multiple user sessions or a single user session.

In some implementation, an events language can be used to create runtime filters for modeled events or sequence of events. The event language can include operators including but not limited to the following operators:

Rate($x_i$, t): The number of times an event xi occurs in t seconds or commands.

Oneof({$x_1, \ldots, x_n$}, t): At least one event of denoted set of events occurs in t.

All({$x_1, \ldots, x_n$}, t): All events of a denoted set of events occur at least once in any sequence within t.

Seq($x_1, \ldots, x_n$, t): Events occur in a specified order within t.

TightSeq($x_1, \ldots, x_n$, t): Events occur in a specified order within t and no other events occur.

Dwell(t): There is no user action for at least t seconds.

These and other operators can be used to define filters for higher-level events, such as user dwelled for at least t seconds at item x in menu y following a scroll through menu y. An example of an inference that can be drawn from this event description is that the user found an item of interest in menu y. Thus, a dashboard and/or widget can be presented on the device 102 that can provide information, assistance or functionality related to item x.

A more detailed description of event language and its use can be found in Horvitz et al. The Lumiere Project: Bayesian User Modeling for Inferring the Goals and Needs of Software Users.

Exemplary Dashboard/Widget Modification Process

Figure 4:
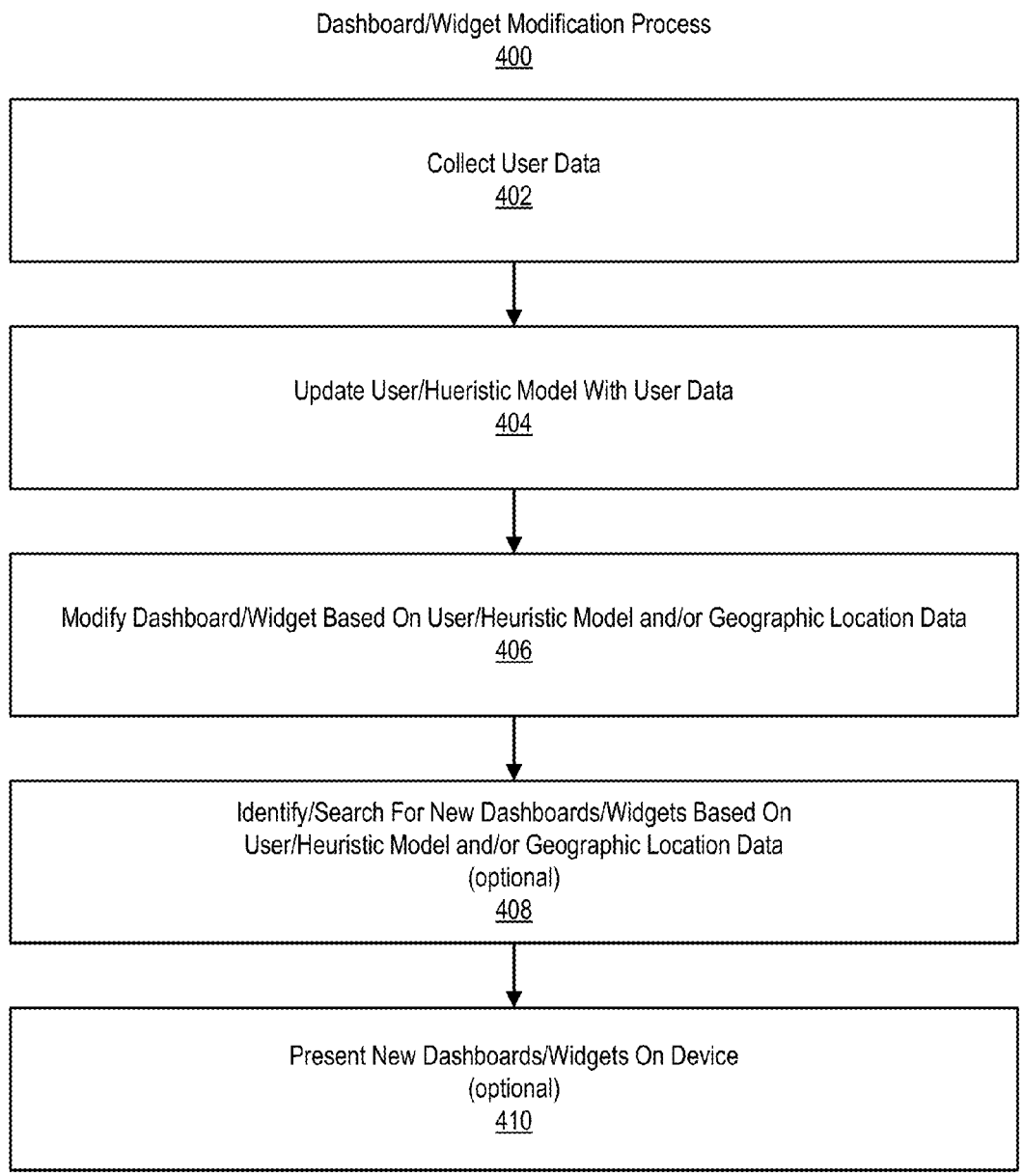
FIG. 4 is a flow diagram of one implementation of a dashboard and widget modification process.

FIG. 4 is a flow diagram of one implementation of a dashboard and widget modification process 400. The process 400 begins when user data (e.g., actions, queries) are collected by, for example, a data collection engine (402). A user model (e.g., a Bayesian user model) is updated with the user data (406). In some implementations, a heuristic model can be used. In some implementations, position data can be used alone or in combination with the user model 114 and/or heuristic model.

Dashboards and/or widgets are modified based on the user model (408), as described in reference to FIGS. 3A and 3B.

In some implementations, the process 400 can include a search (e.g., using a search engine) for new dashboards or widgets based on the user model (410) and presented on a device (412). In some implementations, a dashboard/widget service 500 can provide new dashboards or widgets for a device, as described in reference to FIG. 5.

Dashboard/Widget Service

Figure 5:
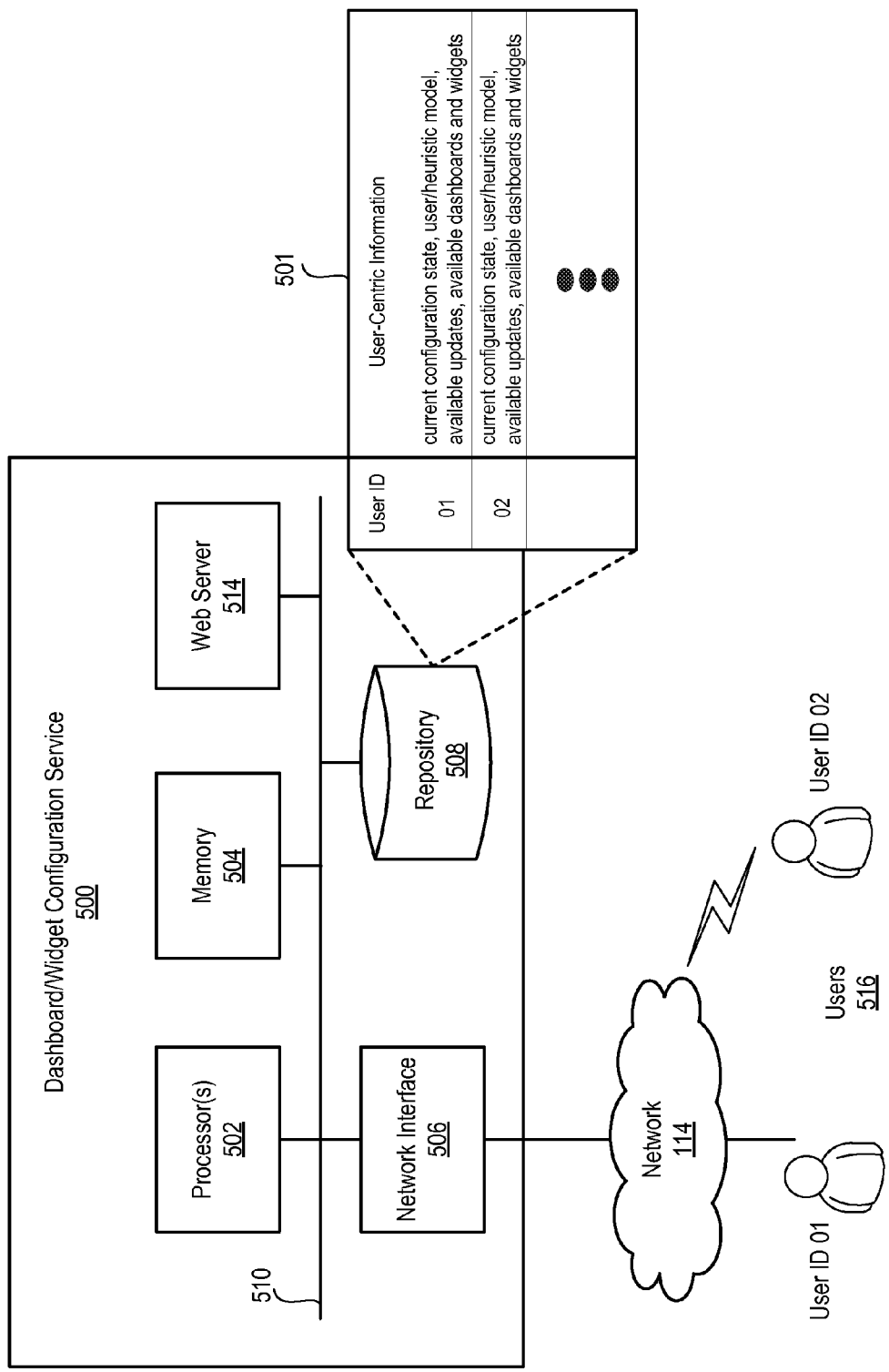
FIG. 5 is a block diagram of one implementation of an architecture for a dashboard/widget.

FIG. 5 is a block diagram of an exemplary dashboard/widget service 500. In some implementations, the service 500 generally includes one or more processors 502, memory 504, a network interface 506, a repository 508 and a web server 514. The service 500 can be a web site that includes one or more servers. The repository 508 is used to store user-centric information 501. The information 501 can include current configuration state for a device to facilitate restoration, user/heuristic models, available updates, available dashboards and widgets, information for displaying widgets (e.g., widget width and height) and for controlling the functionality of dashboards and widgets (e.g., work flows, navigation, access to resources, security) and any other information that has a user-centric nature (e.g., user profiles, preferences, personal information).

The repository 508 can be a database implemented on one or more storage devices (e.g., hard disks, optical disks, memory, storage area network (SAN)) using known database technology (e.g., MySQL®). The web server (e.g., Apache® web server) 514 serves web pages to devices through the network interface 506 (e.g., network interface card, router, hub) and network 512 (e.g., the Internet, wireless network). Memory 504 can be any computer-readable medium (e.g., RAM, ROM, hard disks, optical disks, memory modules). Memory 504 can store instructions for execution by processor(s) 502 (e.g., Intel® Core™ Duo processors). The instructions can be for an operating system (e.g., Mac OS® X server, Windows® NT, Unix, GNI/Linux), network communication software (e.g., TCP/IP software), applications and/or any other software used by the configuration service 700.

As described in reference to FIG. 1, a user 516 can connect a device to network 512 either directly or through a host computer. Upon connection, the user's browser can be automatically opened and the user can be directed by a URI to a website operated by the configuration service 500. The user 516 can be associated with a User ID that can be used by the configuration service 500 to index the repository 508 and identify user-centric information 501 associated with the User ID. In the example shown, "User ID 01" can be associated with a first user 516 of a particular brand and model of, for example, a media player/recorder. Similarly, the "User ID 02" can be associated with a second user 516 of a particular brand and model of mobile phone.

In some implementations, the service 500 maintains and stores in a repository 106 one or more user/heuristic models for users, which can be accessed by the users 516 over a network and used to recommend modifications to dashboards and widgets. The repository can also include configuration data, templates and other user data that can be used to modify dashboards and/widgets, as described in reference to FIGS. 1-4.

Dashboard/Widget APIs

In some implementations, dashboards and widgets interact with an application programming interface (API). A dashboard or widget can be installed on a device and configured to communicate with the device through the API. In some implementations, a dashboard or widget can introspect the environment of a device using the API, and then configure itself to work on the device using information obtained through the API. In some implementations, a dashboard or widget can provide information to the device through the API, allowing the device to configure itself to work with the dashboard or widget.

In some implementations, the API specifies a "presentation mode" that describes the display capability of a device. For example, a dashboard or widget can learn the "presentation mode" of a device and configure itself to comply with the mode. In some implementations, the "presentation mode" could include a "large display" configuration, a "medium display" configuration and a "small display" configuration, which correspond to the display size of the device. For example, in a "small display" configuration, the dashboard or widget can scale icons and images to fit the small display.

In some implementations, the API specifies an "input capability" that describes the input controls available on a device. A dashboard or widget can learn of the input capabilities of a device through the API and configure itself to work with those capabilities. For example, if a device includes a scroll wheel, a widget can configure itself to allow scrolling that is optimized for a scroll wheel.

In some implementations, the API can be used by the dashboard/widget update engine 304 (FIG. 3A) to modify dashboards and/or widgets in accordance with modification recommendations, as described in reference to FIGS. 1-4.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications may be made to the disclosed implementations and still be within the scope of the following claims.

What is claimed is:

1. A method, comprising:
   searching for dashboards or widgets for a device of a user based on a search query derived without user input by an operating system or application running on the device, the search query derived from a history of user actions and a geographic location of the device;
   receiving, through a network interface, the dashboards or widgets resulting from said search;
   presenting the dashboards or widgets on a user interface of the device;
   receiving a selection of a dashboard or widget from the dashboards or widgets presented on the user interface; and
   invoking the selected dashboard or widget on the device.

2. The method of claim 1, further comprising:
   updating the dashboard or widget.

3. The method of claim 2, wherein updating the dashboard or widget further comprises:
   updating the presentation of the dashboard or widget.

4. The method of claim 2, wherein updating the dashboard or widget further comprises:
   updating a state of the dashboard or widget.

5. The method of claim 2, wherein updating the dashboard or widget further comprises:
   updating functionality of the dashboard or widget.

6. The method of claim 2, wherein updating the dashboard or widget further comprises:
   updating the dashboard or widget based on a model that includes one or more rules that indicate whether or not the user is performing a certain task on the device.

7. The method of claim 2, further comprising:
updating the dashboard or widget based on user preferences associated with the operating system or application.

8. The method of claim 2, wherein updating the dashboard or widget further comprises:
updating the dashboard or widget based on a profile of a user of the device.

9. The method of claim 2, wherein updating the dashboard or widget further comprises:
updating the dashboard or widget based on a context in which a user of the device is working.

10. The method of claim 1, further comprising:
storing the history of user actions and the geographic location of the device on a network.

11. The method of claim 1, further comprising:
responsive to invoking the selected dashboard or widget, automatically invoking another dashboard or widget on the device.

12. The method of claim 1, where presenting the dashboards or widgets on the user interface, further comprises enabling a preview of at least one dashboard or widget.

13. The method of claim 1, where invoking the selected dashboard or widget includes launching the dashboard or widget on the device.

14. The method of claim 1, where invoking the selected dashboard or widget includes downloading a dashboard or widget onto the device.

15. The method of claim 1, where the history of user actions and the geographic location of the device is provided by an external device, with which the user is interacting.

16. A system comprising:
a processor;
memory operatively coupled to the processor and having instructions stored thereon, which, when executed by the processor, cause the processor to perform operations comprising:
searching for dashboards or widgets for the system based on a search query derived without user input by an operating system or application running on the system, the search query derived from a history of user actions and based on a geographic location of the system;
receiving, through a network interface, the dashboards or widgets resulting from said search;
presenting the dashboards or widgets on a user interface of the system;
receiving a selection of a dashboard or widget from the dashboards or widgets presented on the user interface; and
invoking the selected dashboard or widget on the system.

17. The system of claim 16, where the memory includes instructions, which, when executed by the processor, causes the processor to perform the operation:
responsive to invoking the selected dashboard or widget, automatically invoking another dashboard or widget on the system.

18. The system of claim 16, where the memory includes instructions, which, when executed by the processor, causes the processor to perform the operation:
enabling a preview of a dashboard or widget.

19. The system of claim 16, further comprising:
updating the dashboard or widget based on a heuristic model that includes rules, which if complied with, indicate that the user is performing a certain task.

20. The system of claim 16, further comprising:
updating the dashboard or widget based on a profile of a user of the system.

21. A non-transitory, computer-readable storage medium having instructions stored thereon, which, when executed by one or more processors of a device, cause the one or more processors to perform operations comprising:
searching for dashboards or widgets for the device of a user based on a search query derived without user input by an operating system or application running on the device, the search query derived from a history of user actions and a geographic location of the device;
receiving, through a network interface, the dashboards or widgets resulting from said search;
presenting the dashboards or widgets on a user interface of the device;
receiving a selection of a dashboard or widget from the dashboards or widgets presented on the user interface; and
invoking the selected dashboard or widget on the device.

* * * * *